United States Patent
Lee

(10) Patent No.: US 10,584,398 B2
(45) Date of Patent: Mar. 10, 2020

(54) AUTOCLAVE AND METHOD FOR REMOVING SALT FROM AUTOCLAVE

(71) Applicant: KOREA ZINC CO., LTD., Seoul (KR)

(72) Inventor: Je Joong Lee, Seoul (KR)

(73) Assignee: KOREA ZINC CO., LTD., Seoul (KR)

( * ) Notice: Subject to any disclaimer, the term of this patent is extended or adjusted under 35 U.S.C. 154(b) by 0 days.

(21) Appl. No.: 16/287,657

(22) Filed: Feb. 27, 2019

(65) Prior Publication Data

US 2019/0249272 A1    Aug. 15, 2019

Related U.S. Application Data

(63) Continuation of application No. PCT/KR2018/001950, filed on Feb. 14, 2018.

(30) Foreign Application Priority Data

Feb. 13, 2018    (KR) .................. 10-2018-0017920

(51) Int. Cl.
    *C22B 3/02*    (2006.01)
    *C22B 3/04*    (2006.01)
    (Continued)

(52) U.S. Cl.
    CPC .............. *C22B 3/02* (2013.01); *B01J 3/048* (2013.01); *B01J 19/0066* (2013.01); *B08B 3/04* (2013.01);
    (Continued)

(58) Field of Classification Search
    CPC .... C22B 3/00; C22B 3/02; C22B 3/06; C22B 3/08; C22B 3/20; C22B 19/00;
    (Continued)

(56) References Cited

U.S. PATENT DOCUMENTS

| 2,028,968 A | 1/1936 | Carlstrom |
| 4,921,918 A | 5/1990 | Pommier et al. |

(Continued)

FOREIGN PATENT DOCUMENTS

| CN | 101318121 A | 12/2008 |
| CN | 201648482   | 11/2010 |

(Continued)

OTHER PUBLICATIONS

English translation of the abstract of CN 203196372 U, publish on Sep. 18, 2013 (Year: 2013).*

(Continued)

*Primary Examiner* — Natasha E Young
(74) *Attorney, Agent, or Firm* — Hamre, Schumann, Mueller & Larson, P.C.

(57) ABSTRACT

A vertical autoclave according to an embodiment of the present disclosure is a vertical autoclave including an inlet port through which a process solution is introduced, an outlet port through which the process solution is discharged, an oxygen inlet port through which oxygen is supplied to the process solution, an agitator configured to mix the process solution, an inner wall, an acid-resistant brick layer lined on a lower portion and a side portion of the inner wall, and an acid-resistant metal layer lined on an upper portion of the inner wall. A method of removing salt from an autoclave includes raising a surface level of a solution in the autoclave from a first level to a second level such that salt in the autoclave is immersed in the solution, and maintaining the surface level of the solution at the second level. The salt is dissolved in the solution while the surface level of the solution is maintained at the second level.

30 Claims, 15 Drawing Sheets

(51) Int. Cl.

| | | |
|---|---|---|
| *C22B 3/08* | (2006.01) | |
| *C22B 3/20* | (2006.01) | |
| *C22B 19/20* | (2006.01) | |
| *B01J 19/00* | (2006.01) | |
| *B01J 19/18* | (2006.01) | |
| *B08B 3/04* | (2006.01) | |
| *C22B 3/00* | (2006.01) | |
| *B01J 3/04* | (2006.01) | |

(52) U.S. Cl.
CPC .................. *C22B 3/08* (2013.01); *C22B 3/20* (2013.01); *C22B 19/22* (2013.01); *B01J 3/04* (2013.01); *B01J 2203/0605* (2013.01)

(58) Field of Classification Search
CPC .. C22B 19/20; C22B 19/22; B01J 3/00; B01J 3/04; B01J 19/18; B01J 19/00; B01J 19/0053; B01J 19/0066; B08B 3/00; B08B 3/04
See application file for complete search history.

(56) References Cited

U.S. PATENT DOCUMENTS

| | | | | |
|---|---|---|---|---|
| 5,489,326 | A * | 2/1996 | Thomas | C22B 3/02 423/27 |
| 5,980,606 | A | 11/1999 | Sarma et al. | |
| 7,604,783 | B2 * | 10/2009 | King | C22B 3/08 423/29 |
| 9,732,400 | B2 | 8/2017 | Matsubara et al. | |
| 2002/0084559 | A1 | 7/2002 | Hazlebeck | |
| 2003/0167984 | A1 | 9/2003 | Abdullah et al. | |
| 2011/0174113 | A1 * | 7/2011 | Motteram | C22B 3/08 75/743 |
| 2013/0105378 | A1 | 5/2013 | Wang et al. | |
| 2015/0086450 | A1 | 3/2015 | Matsubara et al. | |

FOREIGN PATENT DOCUMENTS

| | | | |
|---|---|---|---|
| CN | 201793684 | U | 4/2011 |
| CN | 102086111 | A * | 6/2011 |
| CN | 203196372 | U * | 9/2013 |
| CN | 203400714 | U | 1/2014 |
| CN | 203525671 | U | 4/2014 |
| CN | 103769024 | | 5/2014 |
| CN | 204275959 | U | 4/2015 |
| CN | 204447945 | | 7/2015 |
| CN | 204619920 | | 9/2015 |
| CN | 206229350 | U | 6/2017 |
| CN | 206325413 | U | 7/2017 |
| CN | 206494958 | | 9/2017 |
| JP | S60101489 | A | 6/1985 |
| JP | 05-051628 | | 7/1993 |
| JP | 05-078513 | | 10/1993 |
| JP | 2002153835 | A | 5/2002 |
| KR | 10-2016-0124525 | | 10/2016 |
| WO | 2015/021524 | | 2/2015 |

OTHER PUBLICATIONS

English translation of the abstract of CN 102086111 A, publish on Jun. 8, 2011 (Year: 2011).*
Korean Office Action, issued in the corresponding Korean application No. 10-2018-0017920, dated Mar. 21, 2018, 17 pages.
"Gas-Liquid Mass Transfer Data in a Stirred Autoclave Reactor", Industrial & Engineering Chemistry Fundamentals, vol. 23, No. 4, 1984, pp. 510-512.
Korean Notice of Allowance, issued in the corresponding Korean application No. 10-2018-0017920, dated Jun. 15, 2018, 3 pages.

* cited by examiner

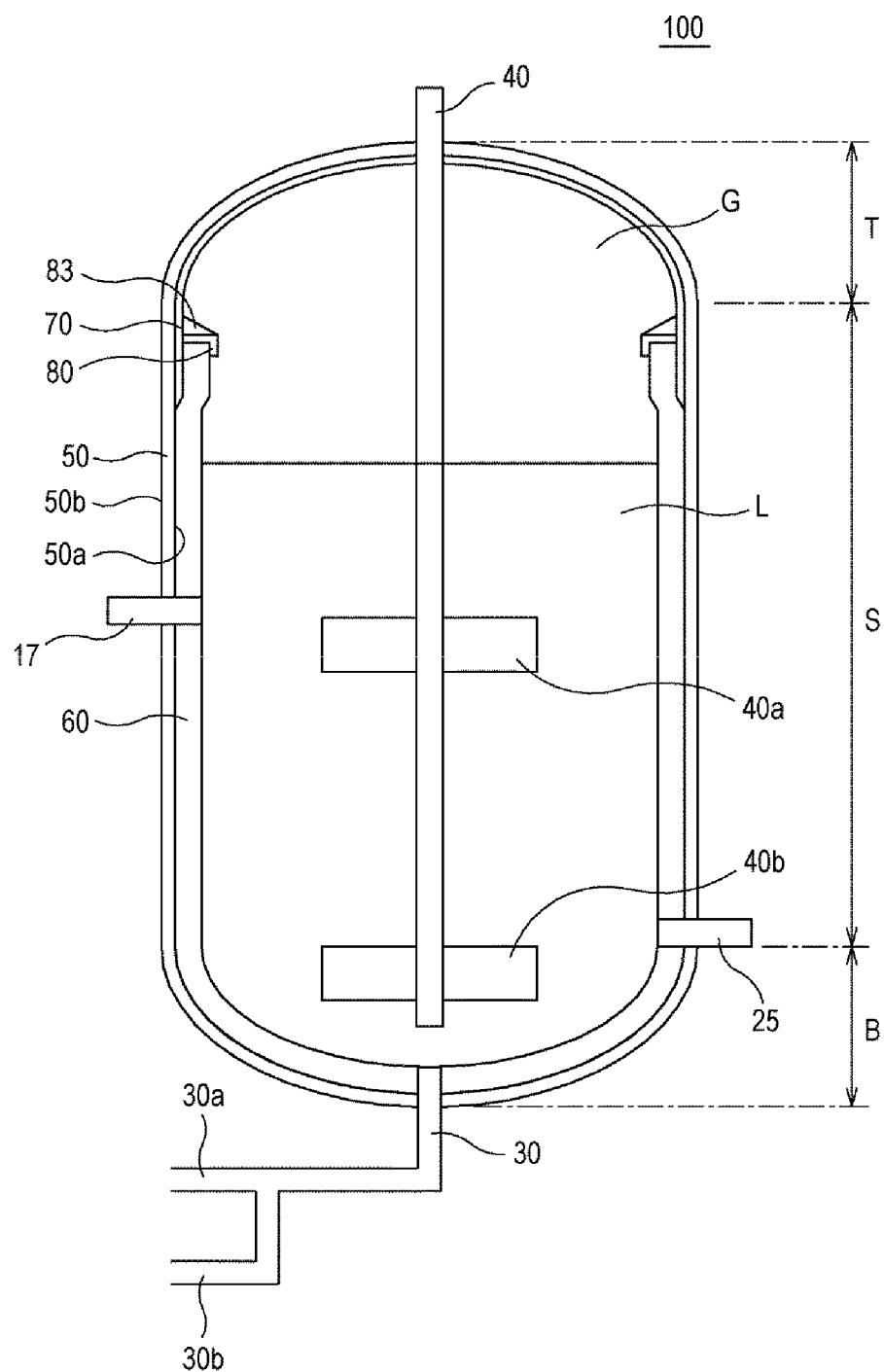

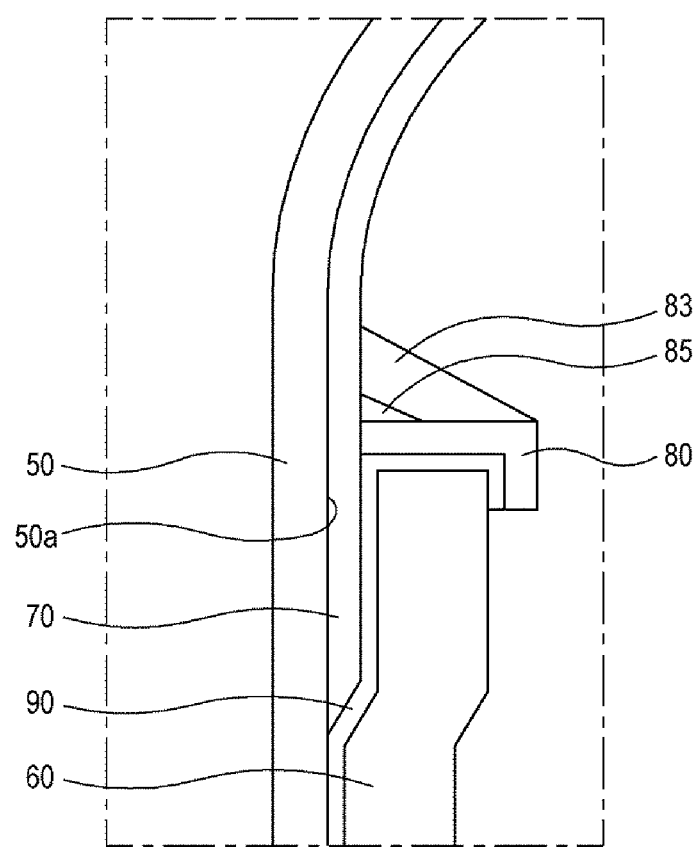

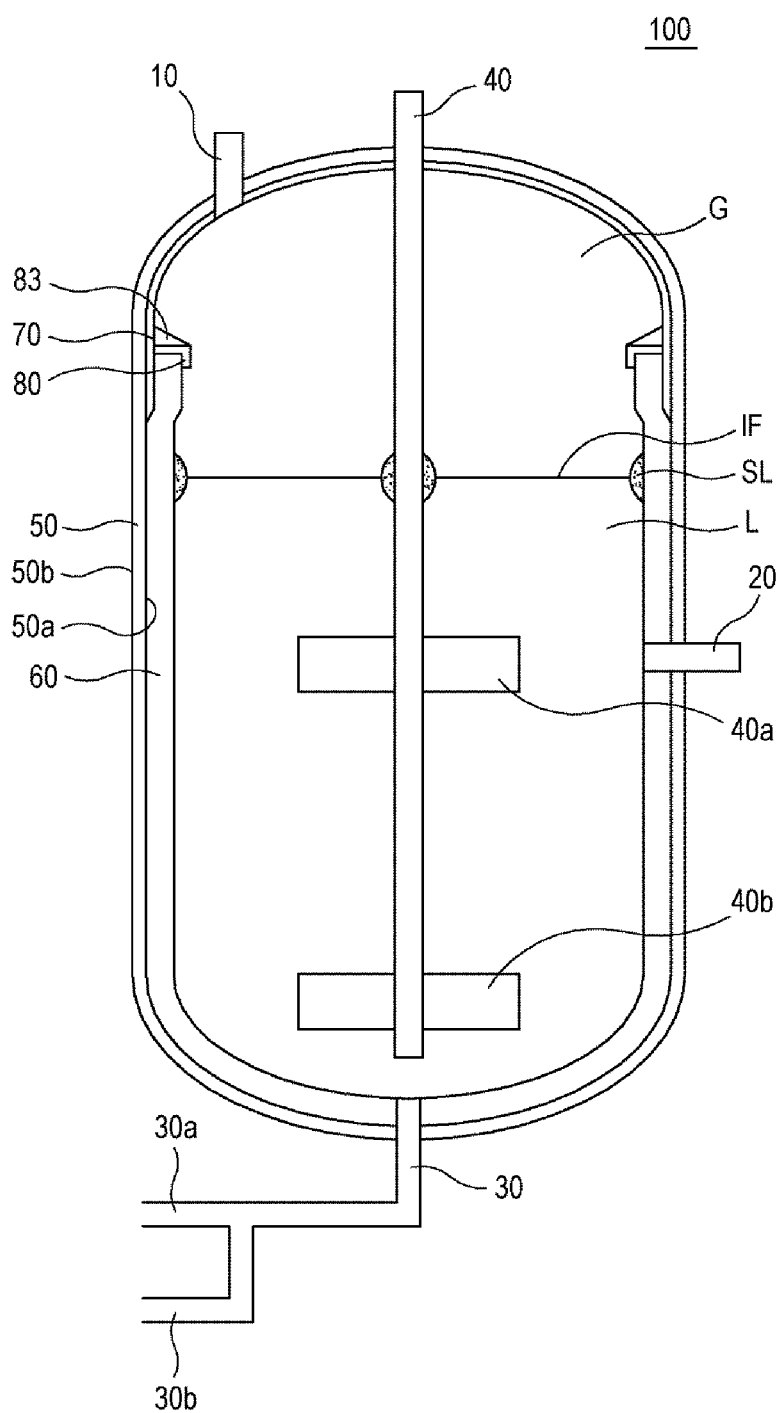

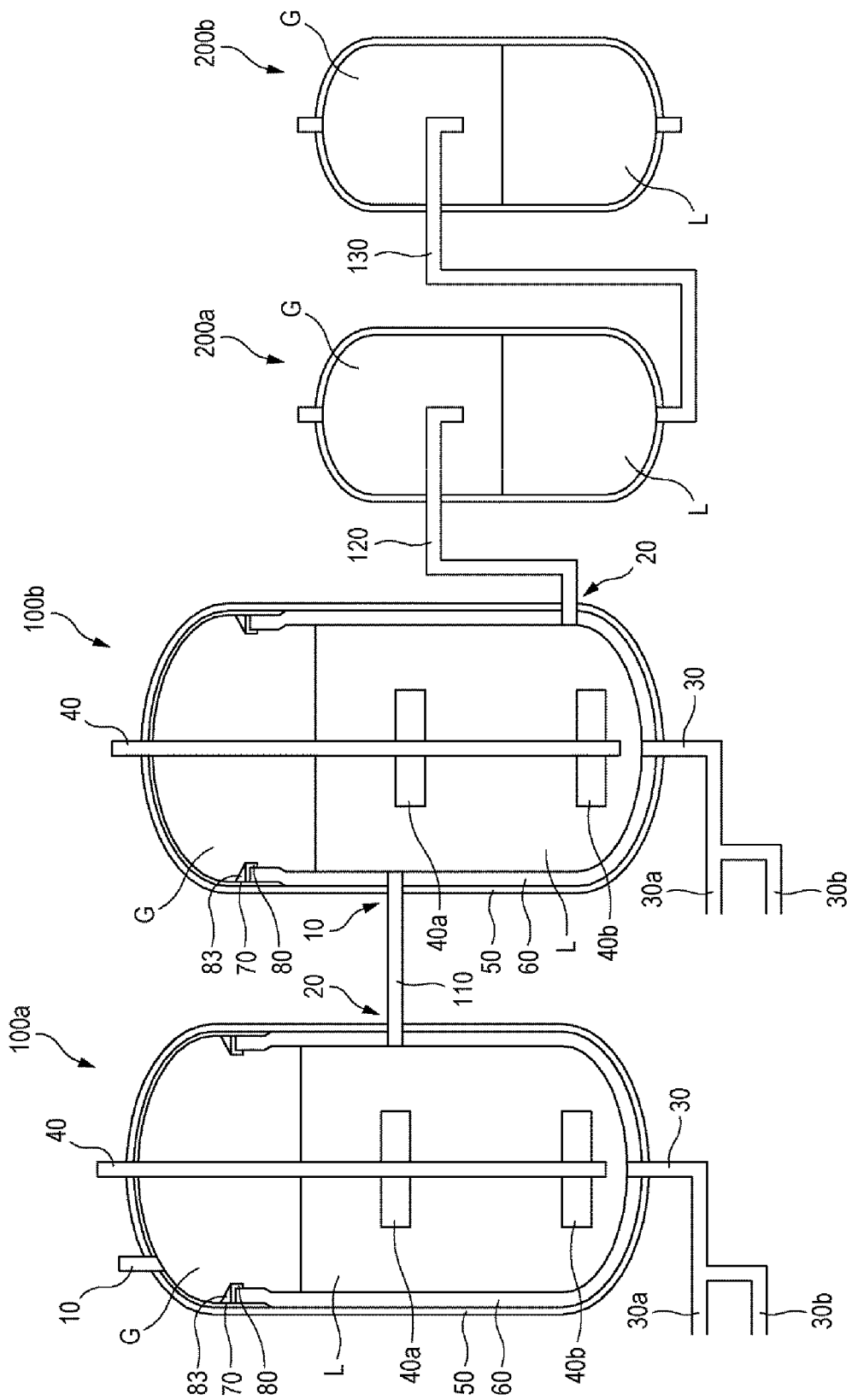

AUTOCLAVE AND METHOD FOR REMOVING SALT FROM AUTOCLAVE

CROSS-REFERENCE TO RELATED APPLICATION

This application is a Continuation Application of PCT International Application No. PCT/KR2018/001950, now WO/2019/135442, filed on Feb. 14, 2018, which claimed the benefit of Korean Patent Application No. 10-2018-0017920, filed on Feb. 13, 2018, the entire content of each of which is hereby incorporated by reference.

TECHNICAL FIELD

The present disclosure relates to an autoclave and a method for removing salt from the autoclave, and more particularly, to a vertical autoclave and a method for removing salt from the vertical autoclave.

BACKGROUND

In order to carry out a reaction under high-temperature and high-pressure conditions, an autoclave apparatus, which is a high-pressure reactor, is required. Conventionally, horizontal autoclaves capable of increasing the capacity by increasing the length thereof while maintaining or even decreasing the diameter thereof have been widely used in order to manufacture a large-capacity autoclave apparatus. Such conventional horizontal autoclaves are disclosed in International Patent Publication No. 2015/021524, U.S. Patent Laid-Open Publication No. 2015/0086450, U.S. Pat. No. 9,732,400, and the like.

A common feature of these horizontal autoclaves is that the inside of one autoclave is divided into several small compartments, and each of the compartments is provided with a separate agitator, thereby integrating several autoclaves into a single unit. Such a horizontal autoclave may be advantageous in that it is easy to manufacture the horizontal autoclave since it is possible to increase an apparatus capacity by increasing the number of compartments even if the diameter thereof is small, and it is possible to drive a large capacity apparatus using small scale agitators.

However, in the case of horizontal autoclaves, it may be necessary to install a plurality of agitators in one apparatus and to install an apparatus for introducing oxygen or the like separately for each compartment, so that the number of necessary nozzles or the like may increase and the rate of operating the apparatus may be lowered due to frequent apparatus failure.

Further, in the case of horizontal autoclaves, the process solution, which has been reacted in each compartment, must be delivered over the upper portion of a blocking wall installed between adjacent compartments so as to be moved to the next compartment. However, because the upper portion of the blocking wall is exposed to a hot gas portion, a large amount of salt due to a process solution evaporation phenomenon may occur in the upper portion of the blocking wall.

Furthermore, due to the characteristics of the horizontal autoclave, a contact interface between the process solution and the gas layer in the upper portion is wide. Because the gas layer is maintained at a high temperature, a large amount of salt is precipitated by the process solution evaporation phenomenon on the surface of the process solution and a wall portion. When the precipitated salt grows in the form of lumps, it may cause an apparatus failure. Therefore, it may be necessary to stop operation of the apparatus periodically and perform maintenance for removing the precipitated salt. Therefore, horizontal autoclaves have a disadvantage in that apparatus operation efficiency is remarkably reduced.

In addition, because horizontal autoclaves have an inner structure which is partitioned by partition walls and angular corners are formed in the respective compartments, the process solution is not agitated well.

SUMMARY

An aspect of the present disclosure is to provide a vertical autoclave for use in a zinc process and the like, which is capable of being manufactured to have a large capacity, low manufacturing cost, and high abrasion resistance against slurry.

Another aspect of the present disclosure is to provide a vertical autoclave for use in a zinc process and the like, which is capable of being manufactured to have a large capacity and is capable of overcoming problems, such as cracking and falling of acid-resistant bricks which are stacked therein.

Another aspect of the present disclosure is to provide a vertical autoclave for use in a zinc process and the like, which is capable of being manufactured to a large capacity, capable of facilitating manufacturing of an agitator shaft, and capable of suppressing occurrence of bending of the agitator shaft or the like.

A vertical autoclave according to an embodiment of the present disclosure is a vertical autoclave including an inlet port through which a process solution is introduced, an outlet port through which the process solution is discharged, an oxygen inlet port through which oxygen is supplied to the process solution, an agitator configured to mix the process solution.

The vertical autoclave includes an inner wall, an acid-resistant brick layer lined on a lower portion and a side portion of the inner wall, and an acid-resistant metal layer lined on an upper portion of the inner wall.

The vertical autoclave may have an inner diameter of 5.5 m or more.

The vertical autoclave may have an inner volume of 150 $m^3$ or more.

A volume of the process solution may be 100 $m^3$ or more when the vertical autoclave is operated.

The autoclave may further include a cap ring which covers an upper portion of the acid-resistant brick layer on the side portion of the inner wall.

The autoclave may further include a membrane layer provided between the inner wall and the acid-resistant brick layer, and the membrane layer may be provided to extend between the upper portion of the acid-resistant brick layer and the cap ring.

The autoclave may further include a plurality of ribs which connect the cap ring and the acid-resistant metal layer.

The cap ring and the plurality of ribs may be formed of the same material as the acid-resistant metal layer.

Voids may be formed among the plurality of ribs, the cap ring, and the acid-resistant metal layer.

The inlet port may be disposed in the upper portion of the inner wall, and the outlet port may be disposed in the side portion of the inner wall.

The inlet port may extend to an inside of the vertical autoclave, and when the vertical autoclave is operated, an end of the inlet port may be immersed in the process solution.

The inlet port and the outlet port may be disposed in the side portion of the inner wall, and the inlet port may be disposed at a position higher than the outlet port.

The oxygen inlet port may be disposed in the lower portion of the inner wall, and the vertical autoclave may further include an oxygen inlet line connected to the oxygen inlet port, and a cooling water passage disposed to surround the oxygen inlet port.

The vertical autoclave may further include a high-pressure steam line communicating with the oxygen inlet line. Steam is supplied through the high-pressure steam line to the oxygen inlet port.

When the vertical autoclave is operated, a water level of the process solution in the vertical autoclave may be adjusted to be lower than an upper portion of the acid-resistant brick layer provided on the side portion of the inner wall.

The acid-resistant metal layer may be lined to extend to an upper end of the side portion of the inner wall.

At the upper end of the side portion of the inner wall, the acid-resistant metal layer may extend between the inner wall and the acid-resistant brick layer.

An autoclave apparatus according to an embodiment of the present disclosure includes a first autoclave and a second autoclave, which are connected in series.

Each of the first autoclave and the second autoclave is a vertical autoclave including an inlet port through which a process solution is introduced, an outlet port through which the process solution is discharged, an oxygen inlet port through which oxygen is supplied to the process solution, an agitator configured to mix the process solution, and an inner wall, an acid-resistant brick layer lined on a lower portion and a side portion of the inner wall, and an acid-resistant metal layer lined on an upper portion.

The autoclave apparatus may further include a connection pipe which connects the first autoclave and the second autoclave. The upper stream side of the connection pipe may correspond to the outlet port of the first autoclave, and the lower stream side of the connection pipe may correspond to the inlet port of the second autoclave.

When the first autoclave and the second autoclave are operated, the outlet port of the first autoclave may be immersed in a solution in the first autoclave, and the inlet port of the second autoclave may be immersed in a solution in the second autoclave.

The first autoclave may be installed at a position higher than the second autoclave.

The autoclave apparatus may further include at least one flash vessel connected to the outlet port of the second autoclave.

A method of removing salt from an autoclave according to an embodiment of the present disclosure includes raising a surface level of a solution in the autoclave from a first level to a second level such that the salt from the autoclave is immersed in the solution, and maintaining the surface level of the solution at the second level.

The salt is dissolved in the solution while the surface level of the solution is maintained at the second level.

The salt may be water-soluble.

Maintaining the surface level of the solution at the second level is performed for one hour to six hours.

The method may further include lowering the surface level of the solution from the second level to the first level again.

The autoclave is a vertical autoclave including an inlet port through which a process solution is introduced, an outlet port through which the process solution is discharged, an oxygen inlet port through which oxygen is supplied to the process solution, an agitator configured to mix the process solution, an inner wall, an acid-resistant brick layer lined on a lower portion and a side portion of the inner wall, and an acid-resistant metal layer lined on an upper portion.

The second level may be lower than the uppermost surface level of the acid-resistant brick layer.

The autoclave may further include a cap ring that covers the upper portion of the acid-resistant brick layer on the side portion of the inner wall.

The second level may be lower than lowermost surface level of the cap ring.

BRIEF DESCRIPTION OF THE DRAWINGS

FIGS. 1A to 1D are cross-sectional views each illustrating an autoclave according to embodiments of the present disclosure;

FIG. 2 is an enlarged view of a portion A in the autoclave in FIG. 1A;

FIGS. 4A to 4D are views for explaining a method for removing salt generated in an autoclave according to embodiments of the present disclosure;

FIG. 5 is a view illustrating a structure in which autoclaves according to embodiments of the present disclosure are connected in series;

DETAILED DESCRIPTION

Figure 1A:
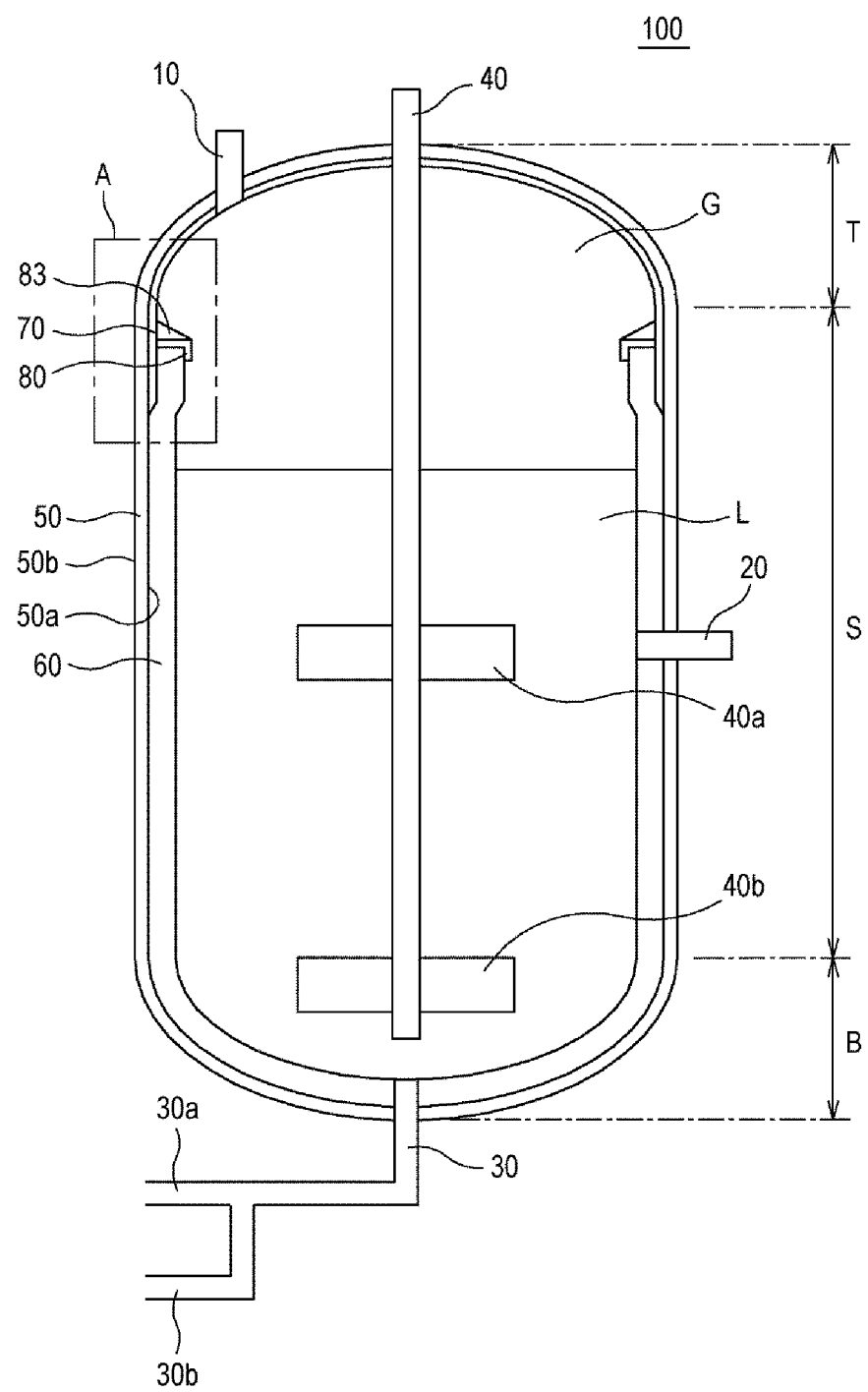

FIGS. 1A to 1D are cross-sectional views each illustrating an autoclave 100 according to embodiments of the present disclosure.

Referring to FIGS. 1A to 1D, the autoclave 100 has a vertical structure. In other words, unlike a horizontal autoclave in which the inside thereof is divided into a plurality of compartments and an agitator is separately provided in each compartment, the inside of the vertical autoclave 100 is provided as a single space, rather than being divided into a plurality of compartments.

The autoclave 100 according to the present disclosure includes an inlet port 10, 13, 15, or 17 through which a process solution is introduced, an outlet port 20 or 25 through which the process solution is discharged, an oxygen inlet port 30 through which oxygen is supplied to the process solution, an agitator 40 configured to mix the process solution, an outer shell 50, an acid-resistant brick layer 60, an acid-resistant metal layer 70, and a cap ring 80.

The shape of the autoclave 100 is determined by the outer shell 50, which includes an outer wall 50b, which is in contact with the outside of the autoclave 100, and an inner wall 50a, which defines the inner space of the autoclave 100.

The inside of the autoclave 100 has a circular horizontal cross section. Therefore, the inside of the autoclave 100 does not have angular corners as in the case of compartments of a horizontal autoclave, so that agitating efficiency can be improved.

The autoclave 100 may be divided into an upper portion T, a side portion S, and a lower portion B, in which the upper portion T and the lower portion B may have a dome-shaped structure. Further, the side portion S may be formed perpendicular to a ground surface.

The lower portion B and the side portion S of the inner wall 50*a* of the autoclave 100 may be lined with the acid-resistant brick layer 60. When performing an acid-leaching process at a high temperature and high pressure within the autoclave 100, the water level of a solution L including the process solution in the autoclave 100 may be adjusted to be lower than the upper portion of the acid-resistant brick layer 60 stacked on the side portion S of the inner wall 50*a*. That is, the solution L is in contact with the acid-resistant brick layer 60, but may not be in contact with the acid-resistant metal layer 70. Further, a gas-phase portion G may be mainly in contact with the acid-resistant metal layer 70.

A large amount of slurry is produced in the solution L by the acid-leaching process performed at a high temperature and high pressure. In order to withstand abrasion caused by rotation of the slurry and acidic condition, the acid-resistant brick layer 60 is formed by stacking bricks, which are excellent in acid resistance and abrasion resistance. As the bricks, various kinds of commercially available acid-resistant bricks may be used, and may be selected variously depending on the kind of used acid, abrasion characteristics of the slurry, and the like. As described above, by lining the lower portion B and the side portion S of the inner wall 50*a* of the autoclave 100, which are in contact with the solution L, with the acid-resistant brick layer 60, the resistance to abrasion caused by the slurry contained in the solution can be enhanced and manufacturing cost of the autoclave apparatus can be lowered.

The upper portion T of the inner wall 50*a* of the autoclave 100 may be lined with the acid-resistant metal layer 70. The acid-resistant metal layer 70 may be formed of stainless steel, a titanium clad (Ti-Clad), or the like, and has high acid resistance. The acid-resistant brick layer does not extend onto the upper portion T of the inner wall 50*a*. Accordingly, the upper portion T of the inner wall 50*a* is not lined with the acid-resistant brick layer.

Generally, upper portion of the autoclave has an arcuate shape, and bricks are stacked thereon. Since the larger the capacity of the autoclave is, the greater the radius of curvature of the upper portion of the autoclave, thus it is more difficult to stack the acid-resistant bricks in the upper portion of the autoclave having a larger capacity. Further, due to the vibration of an agitator installed in the upper portion of the autoclave, cracks may occur in the acid-resistant brick layer stacked in the upper portion, or the bricks may be released and fall from the acid-resistant brick layer, which may collide with agitating elements rotating at a high speed. For this reason, in the related art, a horizontal autoclave structure has been recognized as the only way that is capable of increasing a processing capacity by increasing the length in the horizontal direction while pursuing the stability of the upper brick layer by reducing the radius of curvature of the arcuate brick layer stacked on the upper portion.

According to the embodiments of the present disclosure, by lining the upper portion T of the autoclave 100, which is difficult to be lined with the acid-resistant brick layer among the inner wall 50*a* of the autoclave 100, with the acid-resistant metal layer 70, it is possible to fundamentally eliminate the risk of releasing of the upper bricks while maintaining the abrasion resistance against the slurry in the process solution. Further, even if the autoclave space is not extended horizontally, by increasing the autoclave diameter and the vertical length, it is possible to stably operate a large-capacity vertical autoclave, the operation of which has not been tried in the past. For example, according to embodiments of the present disclosure, the inner diameter of the autoclave 100 may be at least about 5.5 m or more.

According to the embodiments of the present disclosure, by lining the upper portion T of the autoclave 100 with the acid-resistant metal layer 70 and causing a part of the water vapor saturated in the gas-phase portion G to be condensed and flow as condensed water from the surface of the acid-resistant metal layer 70, it is possible not only to prevent salt from being precipitated on the inner wall 50*a* of the autoclave 100, but also to dissolve a small amount of previously formed salt. Therefore, the rate of operating the apparatus can be improved.

The acid-resistant metal layer 70 may be lined to extend to an upper end of the side portion S of the inner wall 50*a*. In addition, the acid-resistant metal layer 70 may extend between the inner wall 50*a* and the acid-resistant brick layer 60 at the upper end of the side portion S of the inner wall 50*a*.

The process solution is input into the autoclave 100 through the inlet port 10, 13, 15, or 17 and is discharged to the outside of the autoclave 100 through the outlet port 20 or 25.

Figure 1B:
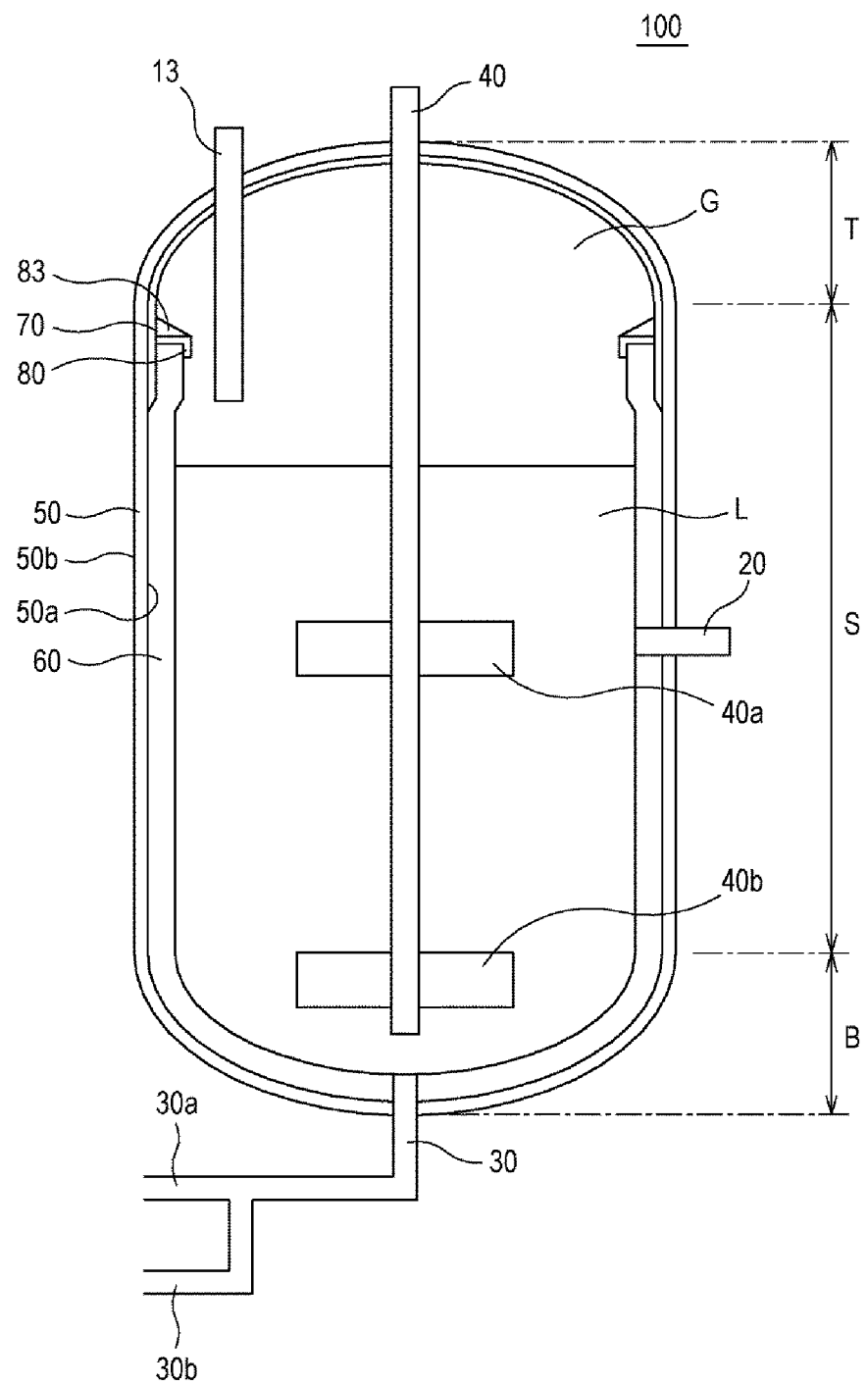
Figure 1C:
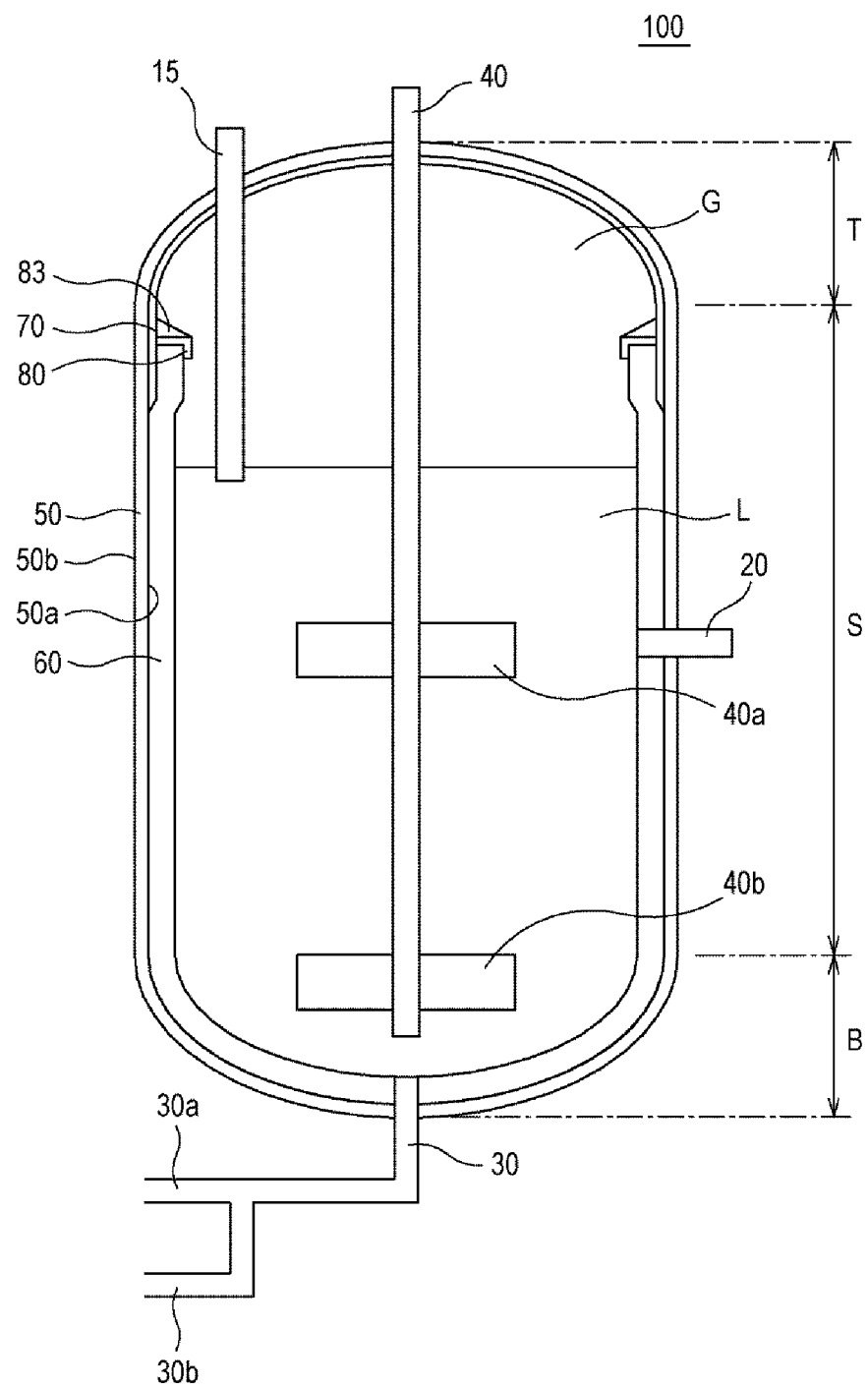

Referring to FIGS. 1A to 1C, the inlet port 10, 13, or 15 may be formed in the upper portion T of the inner wall 50*a*.

Referring to FIG. 1A, the process solution input through the inlet port 10 may be input into the solution L via the gas-phase portion G.

Referring to FIG. 1B, the inlet port 13 extends into the inside of the autoclave 100, and one end of the inlet port 13 extending into the inside of the autoclave 100 may be located in the gas-phase portion G without being immersed in the solution L. In addition, the one end of the inlet port 13 may be located adjacent to the interface between the solution L and the gas-phase portion G.

In the autoclave of FIGS. 1A and 1B, since the process solution input through the inlet port 10 or 13 is exposed to the gas-phase portion G for a short time, no salt may be produced.

Referring to FIG. 1C, the inlet port 15 extends into the inside of the autoclave 100, and one end of the inlet port 15 extending into the inside of the autoclave 100 may be immersed in the solution L. In addition, the one end of the inlet port 15 may be located adjacent to the interface between the solution L and the gas-phase portion G. This makes it possible to prevent the inlet port 15 from being bent or damaged by the agitated process solution even if the process solution (i.e., the solution L) in the autoclave 100 is agitated at a high speed.

Referring to FIG. 1D, the inlet port 17 may be formed in the side portion S of the inner wall 50*a*. That is, the end of the inlet port 17 may be located in the solution L. Accordingly, the process solution input into the autoclave 100 may not be exposed to the gas-phase portion G.

In the autoclave of FIGS. 1C and 1D, the process solution input into the autoclave is not exposed to the gas-phase portion, so that salt can be suppressed from being produced in the inlet port and the inlet port can be prevented from being clogged with the salt.

Referring to FIGS. 1A to 1D again, the outlet port 20 or 25 may be formed in the side portion S of the inner wall 50a. The outlet port 20 or 25 is formed in the solution L of the autoclave 100, and thus the process solution discharged from the autoclave 100 may not be exposed to the gas-phase portion G. Also, the outlet port 20 or 25 may not extend into the inside of the autoclave 100. This makes it possible to prevent the outlet port 20 or 25 from being bent or damaged by the agitated process solution even if the process solution (i.e., the solution L) in the autoclave 100 is agitated at a high speed.

Referring to FIG. 1D, both the inlet port 17 and the outlet port 25 are formed in the side portion S of the inner wall 50a, and the inlet port 17 is disposed at a position higher than the outlet port 25.

According to embodiments of the present disclosure, since the process solution discharged from the autoclave is not exposed to the gas-phase portion, salt can be suppressed from being produced in the outlet port, and the outlet port can be prevented from being clogged by the salt.

The oxygen inlet port 30 is for introducing oxygen as an oxidizing agent for oxidizing the process solution (i.e., the solution L), and the oxygen inlet port 30 may be formed in the lower portion B of the inner wall 50a. When oxygen is input through the lower portion of the autoclave 100, it is possible to secure a sufficient residence time (or a sufficient reaction time) of oxygen in the process solution, so that the reaction efficiency of oxygen can be improved.

An oxygen inlet line 30a is connected to the oxygen inlet port 30, and a high-pressure steam line 30b communicates with the oxygen inlet line 30a. The oxygen input through the oxygen inlet line 30a flows into the process solution through the oxygen inlet port 30. When a predetermined amount of oxygen is continuously input through the oxygen inlet port, the process solution does not flow back to the oxygen inlet port 30 and the oxygen inlet line 30a. However, while the autoclave is actually operated, a small amount of the process solution may be input into the oxygen inlet port due to a variation of input pressure, input flow rate, or the like of the oxygen. The input process solution evaporates in the hot oxygen inlet port, and the components dissolved in the process solution are fixed to the inner wall of the oxygen inlet port, clogging a pipe and obstructing the input of oxygen. If it is necessary to perform maintenance after stopping the operation of the apparatus in order to clean the pipe, this may lower the rate of operating the apparatus. In the autoclave 100 according to the present disclosure, a high-pressure steam line 30b is connected to the oxygen inlet line 30a so as to introduce a small amount of steam at a predetermined time interval that the clogging phenomenon of the oxygen inlet port can be overcome by re-introducing the flowing-back process solution into the autoclave 100 and re-dissolving adhering salt by the steam-condensed water.

The agitator 40 is provided to extend into the inside of the autoclave 100 through the upper portion T of the inner wall 50a. The agitator 40 facilitates the reaction of the process solution by agitating the solution L at the time of performing the leaching process. The agitator 40 includes a first agitating blade 40a and a second agitating blade 40b, in which the first agitating blade 40a agitates the upper portion of the solution L and the second agitating blade 40b agitates the lower portion of the solution L.

Compared with a conventional one, the autoclave 100 according to embodiments of the present disclosure is capable of being manufactured to have a large capacity, and is capable of being improved in apparatus stability. The inner diameter of the autoclave 100 may be about 5.5 m or more, and the inner volume of the autoclave 100 may be 150 m$^3$ or more. Further, at the time of operating the autoclave 100, the volume of the process solution (i.e., the solution L) may be 100 m$^3$ or more.

In addition, the autoclave 100 according to embodiments of the present disclosure may be used in a wet process of a metal.

FIG. 2 is an enlarged view of a portion A in the autoclave 100 in FIG. 1A.

Referring to FIG. 2, a membrane layer 90 is provided between the inner wall 50a and the acid-resistant brick layer 60. The membrane layer 90 prevents the process solution within the autoclave 100 from flowing into the inner wall 50a and may include a waterproof material.

On a side of the inner wall 50a, a cap ring 80 is provided to cover the upper portion of the acid-resistant brick layer 60. The cap ring 80 may be formed of the same material as the acid-resistant metal layer 70. The cap ring 80 is formed along the inner wall 50a of the autoclave 100 at the upper portion of the acid-resistant brick layer 60.

The upper end of the side portion S of the inner wall 50a may be lined with the acid-resistant metal layer 70, and the membrane layer 90 may be formed between the acid-resistant metal layer 70 and the acid-resistant brick layer 60 at the upper end of the side portion S of the inner wall 50a. In addition, the membrane layer 90 may be formed to extend between the upper portion of the acid-resistant brick layer 60 and the cap ring 80.

The cap ring 80 and the acid-resistant metal layer 70 are connected to each other by a plurality of ribs 83. The ribs 83 serve as supports for supporting the cap ring 80, and may be formed of the same material as the acid-resistant metal layer 70.

Voids 85 may be formed among the plurality of ribs 83, the cap ring 80, and the acid-resistant metal layer 70. When a process using the autoclave 100 is performed, the internal temperature of the autoclave 100 may rise to 150° C. or higher, and thus the acid-resistant brick layer 60 may expand or shrink. The voids 85 are capable of acting to buffer the mechanical fracture of the cap ring 80 and the ribs 83 when the acid-resistant brick layer 60 expand or shrink.

Figure 3:
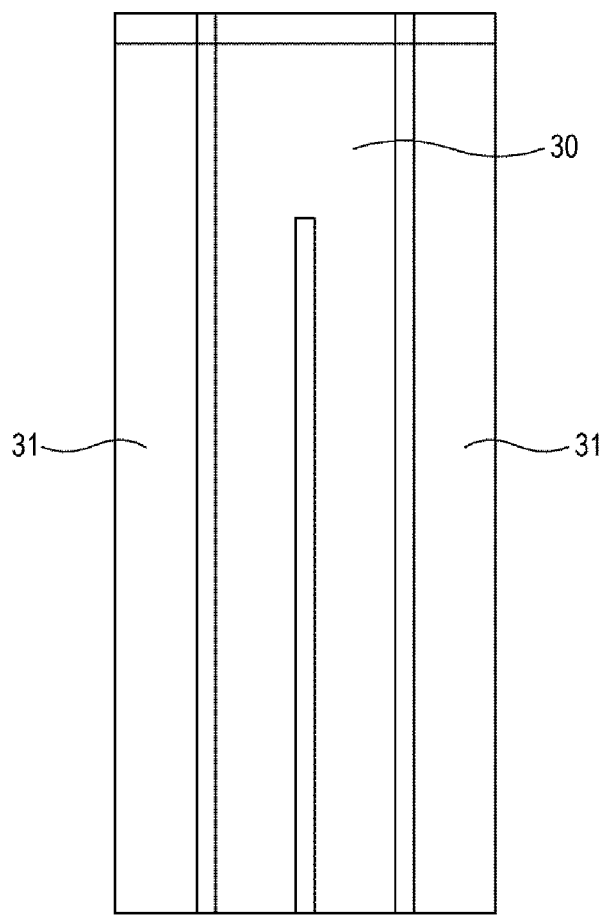
FIG. 3 is an enlarged view of an oxygen inlet port in the autoclave according to embodiments of the present disclosure.

FIG. 3 is an enlarged view of an oxygen inlet port in the autoclave according to embodiments of the present disclosure.

Referring to FIG. 3, the autoclave may further include a cooling water passage 31 provided to surround the oxygen inlet port 30. Cooling water may flow through the cooling water passage 31 if necessary.

In the high temperature and acidic conditions, the corrosion of the autoclave apparatus may be accelerated. The cooling water passage 31 is capable of lowering the temperature of the oxygen inlet port 30 using heat exchange through the inflow and outflow of the cooling water. Accordingly, the cooling water passage 31 may serve to mitigate the corrosion of the autoclave apparatus around the oxygen inlet port 30.

FIGS. 4A to 4D are views for explaining a method for removing salt generated in an autoclave according to embodiments of the present disclosure. For convenience of explanation, a salt removal method will be described with reference to the autoclave 100 described with reference to FIG. 1A. However, a person of ordinary skill in the art may understand that the salt removal method according to embodiments of the present disclosure is also applicable to the autoclaves 100 described with reference to FIGS. 1B to 1D.

Referring to FIG. 4A, salt SL may be generated within the autoclave 100 as a normal process using the autoclave 100 is performed. The salt SL may be produced when a part of the process solution is evaporated and thus may be produced mainly in the vicinity of the interface IF between the solution L and the gas-phase portion G. For example, the salt SL may be produced on the surface of the acid-resistant brick layer 60 or on the surface of the agitator 40 near the interface IF between the solution L and the gas-phase portion G. The produced salt SL may be water-soluble. The surface level IF of the solution L in the autoclave 100 during the normal process may be defined as a first level.

Figure 4B:
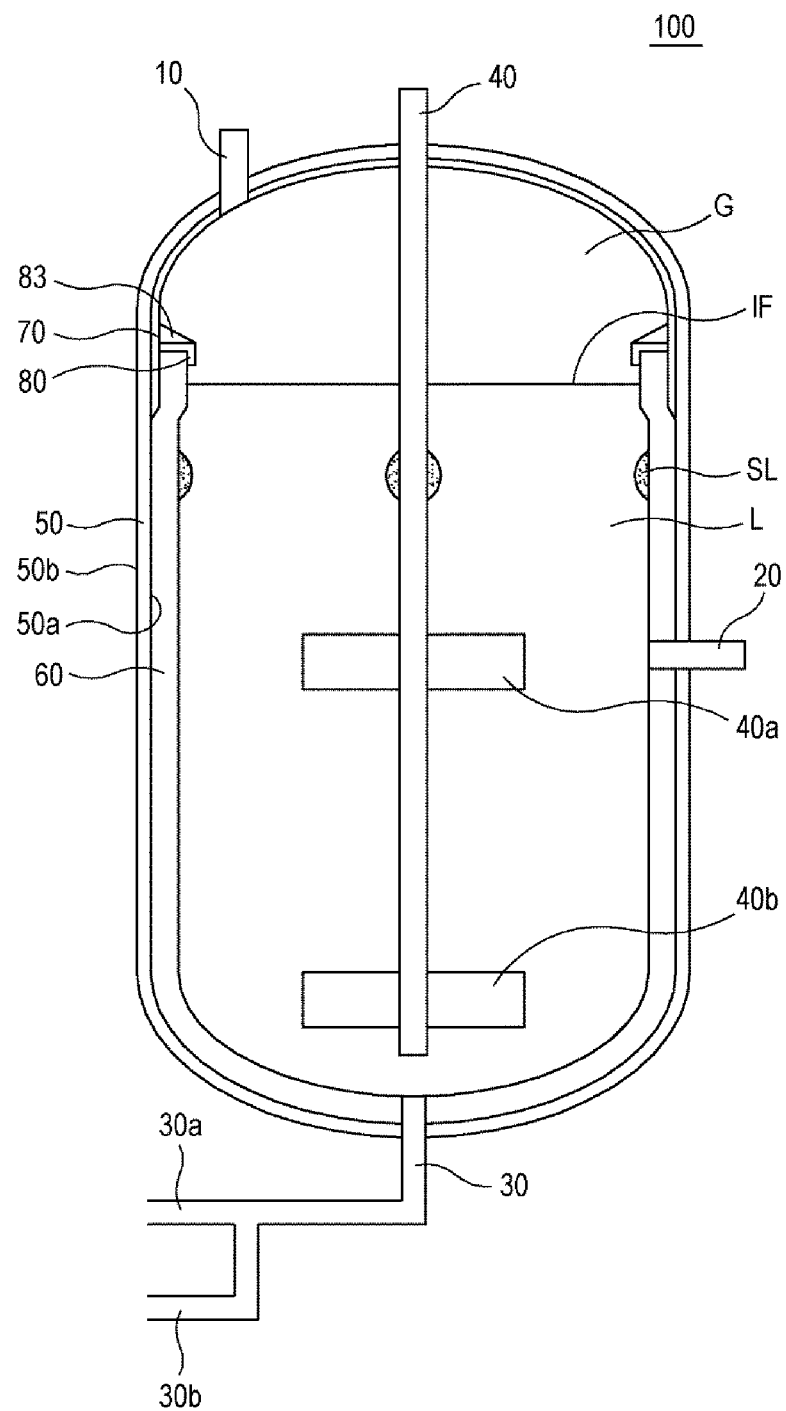

Referring to FIG. 4B, the surface level IF of the solution L in the autoclave 100 is raised to a second level higher than the first level such that the produced salt SL may be immersed in the solution L. For example, raising the surface level IF of the solution L may be performed by introducing the process solution into the autoclave 100 through the inlet port 10 while preventing the process solution from being discharged from the autoclave 100 by blocking the outlet port 20. As another example, raising the surface level IF of the solution L may be performed by increasing the amount of the process solution input through the inlet port 10 than the amount of the process solution discharged through the outlet port 20.

The raised level (i.e., the second level) of the surface IF of the solution L is adjusted to be lower than the uppermost surface level of the acid-resistant brick layer 60. Thus, even when the surface level IF of the solution L is raised to the second level, the solution L may not come into contact with the acid-resistant metal layer 70, and the acid-resistant metal layer 70 can be prevented from being damaged by the slurry contained in the solution L.

The raised level (i.e., the second level) of the surface IF of the solution L may be adjusted to be lower than the lowermost surface level of the cap ring 80. Thus, even when the surface level IF of the solution L is raised to the second level, the solution L may not come into contact with the cap ring 80, and the cap ring 80 can be prevented from being damaged by the slurry contained in the solution L.

Figure 4C:
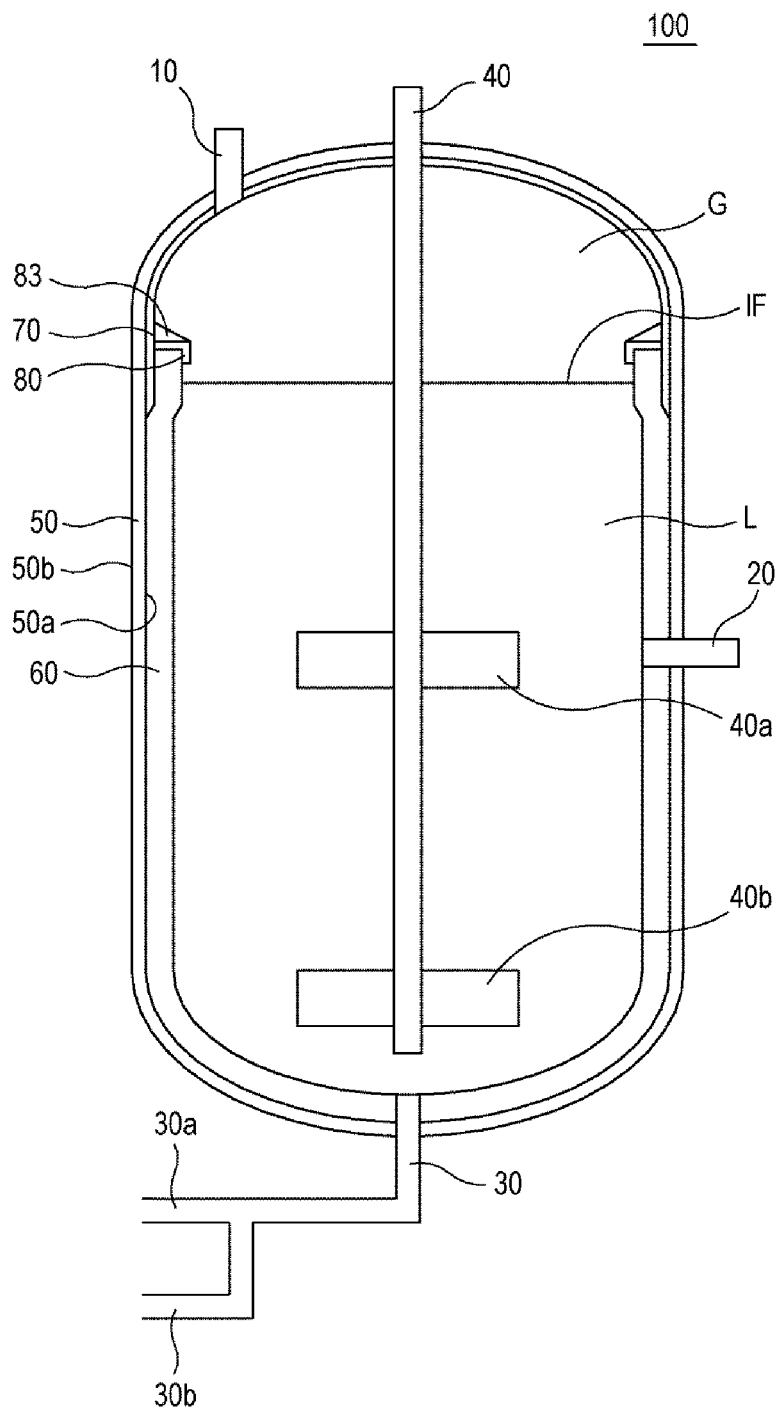

Referring to FIG. 4C, the salt SL is removed by maintaining the surface level IF of the solution L at the second level for a predetermined length of time. The water-soluble salt SL can be dissolved and removed in the solution L as it remains immersed in the solution L for a predetermined length of time. For example, the surface level of the solution L may be maintained at the second level for about 1 hour to about 6 hours.

Figure 4D:
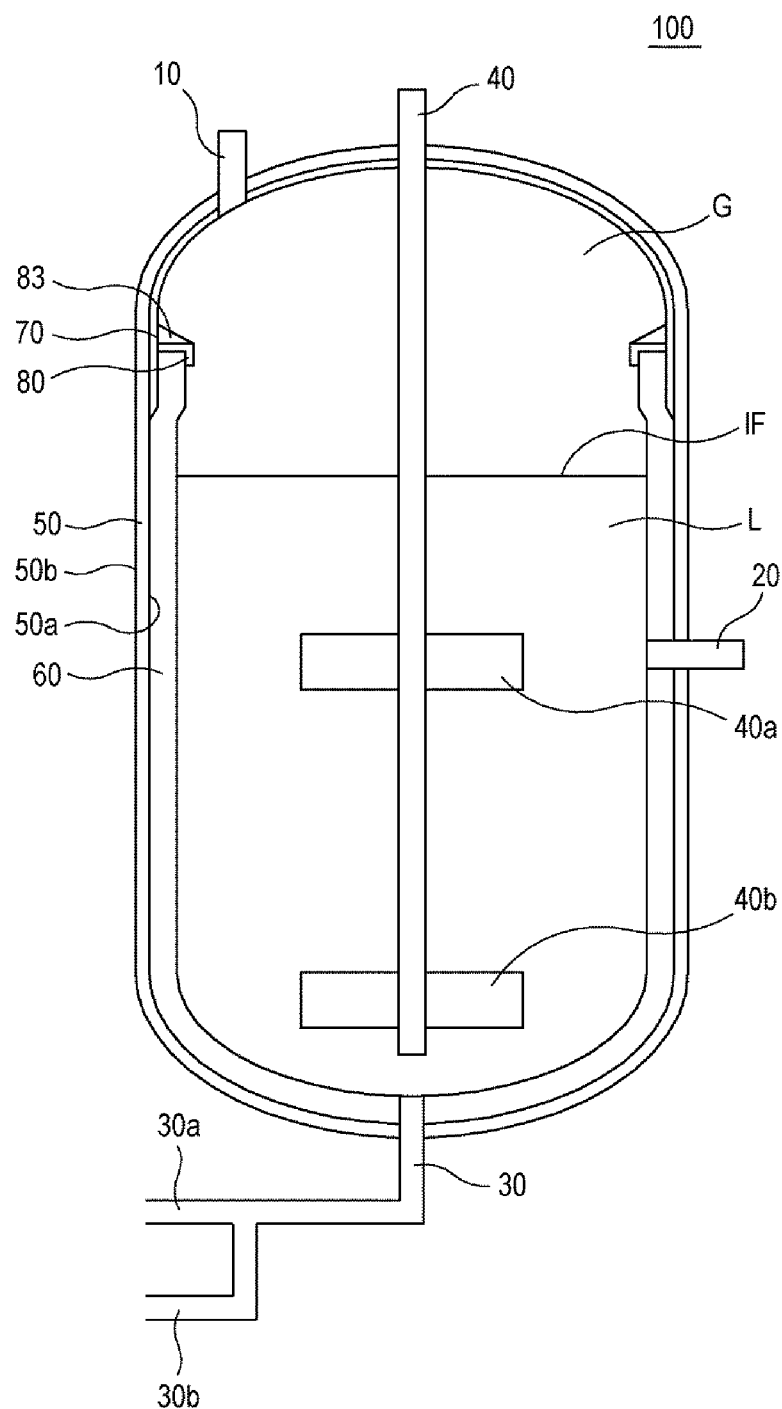

Referring to FIG. 4D, after the salt SL is removed, the surface level IF of the solution L is lowered to a level in a normal process (that is, the first level). Then, the normal process using the autoclave 100 may be performed again.

As described above, according to embodiments of the present disclosure, it is possible to remove the salt from the autoclave 100 through a simple method of raising the surface level of the solution L and maintaining the level for a predetermined length of time without removing the process solution in the autoclave 100. Therefore, the operating efficiency of the autoclave 100 can be improved.

FIG. 5 is a view illustrating a structure in which autoclaves according to embodiments of the present disclosure are connected in series.

Referring to FIG. 5, a first autoclave 100a and a second autoclave 100b are connected in series. The first autoclave 100a may be one of the autoclaves described with reference to FIGS. 1A to 1C, and the second autoclave 100b may be the autoclave described with reference to FIG. 1D.

When the first and second autoclaves 100a and 100b are operated, the process solution may be input through the inlet port 10 of the first autoclave 100a and may be subjected to a reaction process in the first autoclave 100a. The process solution, which has been subjected to the reaction process in the first autoclave 100a, may be input into the second autoclave 100b through a first connection pipe 110 and may be subjected to a reaction process. The upstream side of the first connection pipe 110 may correspond to the outlet port 20 of the first autoclave 100a and the downstream side of the first connection pipe 110 may be connected to the inlet port 10 of the second autoclave 100b.

When the first and second autoclaves 100a and 100b are operated, the outlet port 20 of the first autoclave 100a is immersed in the solution L in the first autoclave 100a, and the inlet port 10 of the second autoclave 100b is immersed in the solution L of the second autoclave 100b. Therefore, the process solution input from the first autoclave 100a to the second autoclave 100b through the first connection pipe 110 may not be exposed to the gas-phase portion G. Thus, it is possible to prevent salt from being produced in the first connection pipe 110.

The first autoclave 100a may be installed at a position higher than the second autoclave 100b. For example, the first autoclave 100a may be installed at a position about 10 cm to about 100 cm higher than the second autoclave 100b. This may allow the process solution to be input from the first autoclave 100a to the second autoclave 100b while preventing the process solution from being flowing back from the second autoclave 100b into the first autoclave 100a.

One or more flash vessels 200a and 200b may be connected to the outlet port 20 of the second autoclave 100b. For example, as illustrated in FIG. 5, the first flash vessel 200a and the second flash vessel 200b may be connected to the second autoclave 100b in series. The first flash vessel 200a may be connected to the second autoclave 100b through the second connection pipe 120, and the second flash vessel 200b may be connected to the first flash vessel 200a through the third connection pipe 130.

The high-pressure process solution discharged from the second autoclave 100b may be decompressed by the first and second flash vessels 200a and 200b. For example, the high-pressure process solution discharged from the second autoclave 100b may be decompressed to atmospheric pressure by the first and second flash vessels 200a and 200b.

In FIG. 5, the two autoclaves 100a and 100b and the two flash vessels 200a and 200b are connected in series, but the present disclosure is not limited thereto. For example, only one flash vessel may be connected to the outlet port 20 of the second autoclave 100b, or three or more flash vessels may be connected to the outlet port 20. In addition, the above-described various types of autoclaves may be additionally disposed in series between the second autoclave 100b and the first flash vessel 200a.

Hereinafter, a zinc process performed using an autoclave according to embodiments of the present disclosure will be described.

In the general zinc process, iron (Fe) and copper (Cu) are also leached together with sulfuric acid in the process of leaching a zinc raw material into the sulfuric acid, and iron in the Fe (III) state contained in a leaching solution is reduced to Fe (II) using a reducing agent such as zinc concentrate. The sulfuric acid remaining in the reducing solution is neutralized to a more neutral pH range using a neutralizing agent such as a calcine, and is then subjected to solid-liquid separation to obtain a neutralized zinc sulfate solution.

A considerable amount of Fe (II) is dissolved in the neutralized zinc sulfate solution, and is fed to a de-ironing process so as to remove iron.

Copper contained in a de-ironing process solution is separated by solid-liquid separation, and then a reducing agent is added thereto so as to reduce and precipitate copper (Cu) dissolved in the form of copper sulfate ($CuSO_4$) as copper (Cu) cement, which is metallic copper powder, thereby removing the copper. However, in the above-mentioned de-ironing process, the components such as Cu (II) contained in the process solution act as catalysts for rapidly oxidizing Fe (II) to Fe (III) in the precipitation reaction of iron to facilitate the production of jarosite. Thus, higher temperatures and higher pressures were required to precipitate iron from the zinc sulfate solution in the form of hematite.

The present disclosure aims to lower the reaction temperature and pressure of an iron precipitation process to a level lower than those of the related art. In order to lower the reaction temperature and pressure, it is necessary to condition a neutralized zinc sulfate solution so as to remove catalyst components. In addition, when even a trace amount of Fe (III) is present in the solution, it is a condition that jarosite is precipitated. Thus, it is necessary to completely reduce Fe (III) to Fe (II) in the zinc sulfate solution to be input to the iron precipitation process.

Figure 6:
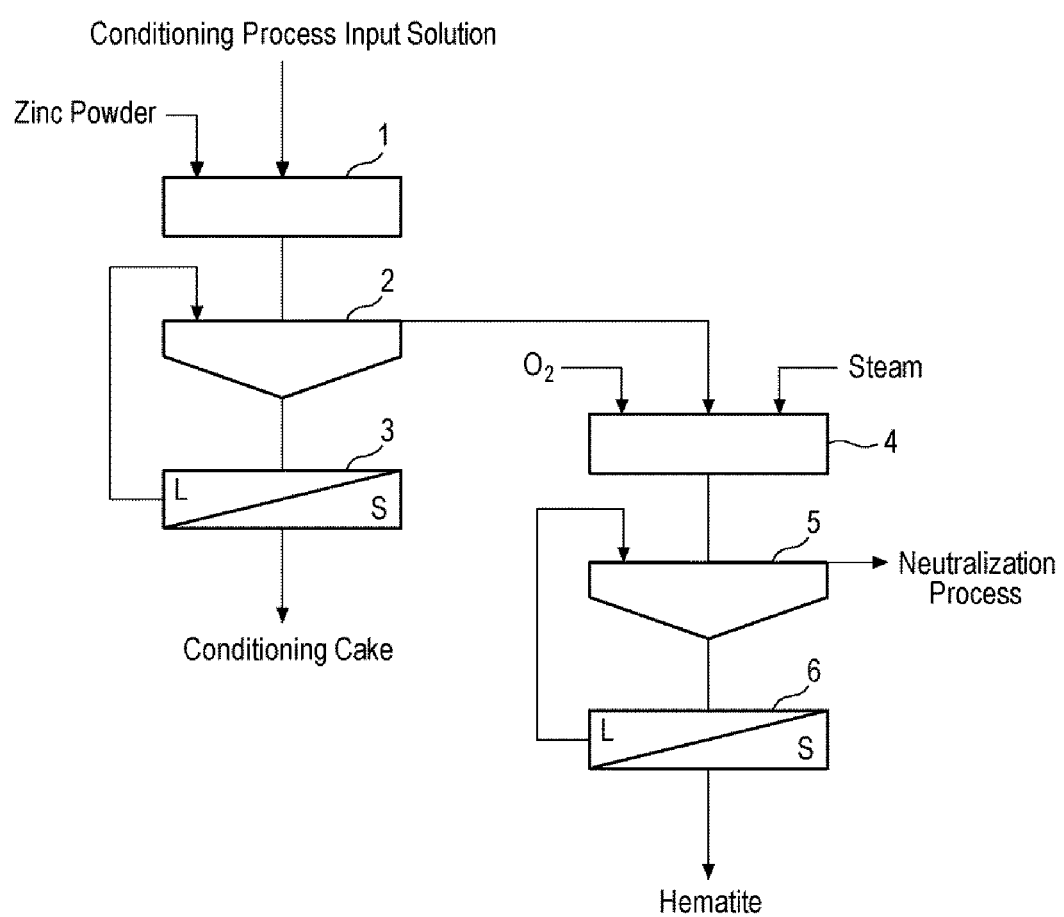
FIG. 6 is a process flowchart for recovering hematite according to an embodiment of the present disclosure.

FIG. 6 is a process flowchart for recovering hematite according to an embodiment of the present disclosure.

In the zinc process, a zinc sulfate solution is prepared by leaching raw materials containing zinc, such as a zinc concentrate, a calcine obtained by roasting the zinc concentrate, or zinc ferrite, into sulfuric acid at atmospheric pressure. The sulfuric acid remaining in the leaching process is first neutralized using a calcine so as to remove impurities therefrom. The iron components leached together in the leaching process of the raw material are not precipitated in the neutralization process, and thus the iron components remain in the process solution after neutralization.

Referring to FIG. 6, the zinc sulfate solution is input to a conditioning process as a conditioning process input solution. In the conditioning process, the conditioning process input solution is input to a conditioning reactor 1, and is discharged as conditioning cake in a filter 3 via a thickener 2, and the post-conditioning process solution is transferred to the iron precipitation process so as to be input as an iron precipitation process input solution.

In the iron precipitation process, the iron precipitation process input solution is input to the iron precipitation reactor 4, the solid portion as hematite is separated via the thickener 5 and the filter 6, and the solution is transferred to the neutralization process as a post-iron precipitation process solution.

In the present disclosure, catalyst components such as copper are removed using a reducing agent in the neutralized conditioning process input solution in order to recover iron as hematite at lower temperatures and lower pressures than those in the conventional technique, and the conditioning process is applied in order to reduce Fe (III) contained in a trace amount into Fe (II).

The conditioning process includes a reducing step performed by inputting a reducing agent, the Oxidation-Reduction Potential (ORP) of the post-conditioning process solution is adjusted by the type and input amount of the reducing agent. In addition, the reducing agent is input into the conditioning reactor 1 into which the conditioning process input solution is input.

The post-conditioning process solution is the iron precipitation process input solution of the iron precipitation process which is the subsequent process.

In the present disclosure, the oxidation-reduction potential of the iron precipitation process input solution is adjusted to −100 mV or less. More specifically, the oxidation-reduction potential is adjusted to −400 mV or less. When the oxidation-reduction potential is higher than −100 mV, ajarosite is partially mixed and thus the iron content of the iron precipitation cake may be lowered to less than 50%. When the oxidation-reduction potential is higher than −100 mV, higher-temperature and higher-pressure conditions are required to produce hematite.

On the contrary, when the oxidation-reduction potential is −100 mV or lower, the reducing atmosphere is dominant, and hematite may be produced at a low temperature and a low pressure compared to the case where the oxidation-reduction potential is higher than −100 mV. In this case, the iron content in the iron precipitate may be 50% or more.

When the oxidation-reduction potential is −400 mV or lower, more excellent hematite is produced at a relatively low temperature and low pressure.

In order to further lower the oxidation-reduction potential, the input amount of the reducing agent may be increased, so that the oxidation-reduction potential can be adjusted in consideration of economic efficiency.

The pH of the iron precipitation process input solution is adjusted to about 3 to 5.5.

When the pH of the iron precipitation process input solution is less than 3, the sulfuric acid contained in the conditioning process input solution reacts with the reducing agent, thereby increasing the amount of the reducing agent that is used. When the pH exceeds 5.5, zinc precipitates in the form of zinc sulfate salt ($nZn(OH)_2 \cdot mZnSO_4$), resulting in loss of zinc in the process solution, and the precipitated zinc salt may become a cause of lowering an apparatus operation rate by adhering to the equipment in the iron precipitation process.

The input amount of the reducing agent may be varied depending on the composition of the conditioning process input solution, such as the concentrations of Fe (III) and copper (Cu) contained in the conditioning process input solution. The input amount of the reducing agent may be determined depending on the Oxidation-Reduction Potential (ORP) value.

As the reducing agent, an inorganic reducing agent, such as zinc powder or aluminum, or an organic reducing agent may be used. The zinc powder is good as a reducing agent because of its excellent reducing power. When zinc concentrate having weak reducing power is used as a reducing agent, unlike the present disclosure, the ORP value is lowered to the level of about 200 mV and cannot be adjusted to 0 mV or lower.

The components such as copper contained in the conditioning process input solution are precipitated in the form of copper cement having a high copper content in the conditioning process and are discharged as conditioning cake. Therefore, after the conditioning process input solution is subjected to solid-liquid separation, copper can be recovered in a copper recovery process. According to the present disclosure, copper cement can be obtained as a byproduct in a conditioning process, which is a pretreatment step of an iron precipitation process.

A post-conditioning process solution produced through this process is transferred to the iron precipitation process in order to produce the iron contained therein in the form of hematite.

The iron precipitation process includes a pressurizing and oxidizing step with oxygen and steam.

The zinc concentration in the iron precipitation process input solution is adjusted to about 120 g/l to 150 g/l. When the concentration of zinc in the iron precipitation process input solution exceeds about 150 g/l, the salt of Zinc Sulfate Monohydrate (ZSM) may be produced at a temperature ranging from about 135° C. to 150° C., which is the temperature condition of the iron precipitation process in the present disclosure. When the concentration of zinc in the iron precipitation process input solution is less than about 120 g/l, the scale of an apparatus for producing the same amount of zinc must be increased, which is not desirable because apparatus operation and apparatus investment costs are high.

The iron concentration of the iron precipitation process input solution is adjusted to about 5 g/l to 20 g/l. Although there is no problem with regard to the production and quality of hematite even at a low iron concentration, when the iron concentration in the iron precipitation process input solution is less than about 5 g/l, the process is not economical in terms of operation efficiency. When the iron concentration of the post-conditioning process solution exceeds 20 g/l, the acid concentration in the process solution after the iron precipitation reaction is increased and thus the iron precipitation rate is decreased. Therefore, as the jarosite is produced, the iron content in the iron precipitate may be lowered.

The step of performing pressurization and oxidization at a high temperature and a high pressure in the iron precipitation step may be carried out using an autoclave.

In the present disclosure, even though the zinc sulfate solution having a high zinc concentration ranging from about 120 g/l to 150 g/l in the process solution is used in the iron precipitation step using the autoclave, iron is recovered as hematite at a temperature ranging from about 135° C. to 150° C. and at a pressure ranging from about 5 barg to 10 barg, which are lower than the temperature and pressure in the related art. In one preferable embodiment, an autoclave process time for iron recovery is about 30 minutes to 3 hours. The iron precipitation process of the present disclosure is capable of recovering hematite having excellent quality at a lower temperature and a lower pressure than in the related art even when a conventional horizontal autoclave is used. However, when the above-described large-capacity vertical autoclave of the present disclosure is used, since the process is performed at a lower temperature and a lower pressure than in the related art, stability in a portion in which the acid-resistant brick lining and the acid-resistant metal lining of the inner wall of the autoclave are in contact with each other or the like can be further secured.

When the pressure inside the autoclave is less than 5 barg, the oxygen partial pressure inside the autoclave is lowered to 2 barg or less and the iron removal rate is decreased. Meanwhile, when the pressure inside the autoclave exceeds 10 barg, it is necessary to increase the pressure of the oxygen and zinc solution to be supplied to the autoclave to 13 barg or higher, which is higher than the pressure inside the autoclave, which may increase the apparatus investment cost.

When the temperature inside the autoclave is less than about 135° C., the jarosite starts to be produced as an iron precipitate, and the iron content in the iron precipitate may be lowered to less than 50%. When the temperature inside the autoclave is higher than 150° C., there is no influence on the production of hematite. However, supersaturated zinc in the process solution is precipitated as zinc sulfate monohydrate, thereby increasing the zinc content of the iron precipitate and decreasing the relative iron content. In addition, the zinc sulfate monohydrate may stick to the inner wall of the autoclave or a pipe in the form of salt, which may cause problems in facilities. Considering the decrease in the zinc recovery rate due to the precipitation of zinc sulfate monohydrate, it is appropriate for the temperature range inside the autoclave to be about 135° C. to 150° C.

In addition, at a temperature of about 60° C. or higher, the solubility of zinc sulfate decreases as the temperature increases. In the related art, the temperature range for producing hematite is about 180° C. or higher, but according to the present disclosure, hematite can be produced at a temperature ranging from about 135° C. to 150° C.

Therefore, according to the present disclosure, it is possible to increase the zinc concentration in the process input solution by performing the process of recovering iron as hematite at a temperature lower than that in the related art. By keeping the zinc concentration higher than in the related art, it is possible to reduce the scale of the zinc production apparatuses and to reduce operation costs by facilitating operation.

Moreover, the hematite produced in the iron precipitation process may be separated from the zinc sulfate solution through the thickener 5 and the filter 6, and may not be input to the iron precipitation process as seeds.

Therefore, the present disclosure overcomes problems such as deteriorated operating efficiency and an increased equipment abrasion rate due to the increase in solid particles in the process solution, which may be caused when produced hematite is input again to the iron precipitation process as seeds.

Hereinafter, the contents of embodiments according to the present disclosure will be described in detail.

Example 1

In Example 1, using a zinc sulfate solution, which was prepared by adjusting ORP by varying the input amount of zinc powder into each neutralized conditioning process input solution, that is, a zinc sulfate leaching solution, the iron precipitation reaction efficiency depending on the ORP value was observed at reaction conditions of 140° C. and 7 barg within an autoclave. When zinc powder is input, the ORP of the zinc sulfate solution is further lowered and Fe (II) becomes more stable in this process. The iron precipitation reaction in Example 1 was carried out without introducing hematite seeds.

The iron precipitation reaction efficiency was observed using a zinc sulfate solution, the ORP of which was adjusted to fall within the range from +200 to −400 mV (vs. Ag/AgCl) when a silver/silver chloride (Ag/AgCl) electrode was used as a reference electrode, under reaction conditions of 140° C. and 7 barg. The ORP in the conditioning process was adjusted by varying the input amount of zinc powder and the iron content in the iron precipitate was quantitatively analyzed using an ICP-AES spectroscopy.

TABLE 1

| | Comparative Example 1 | Comparative Example 2 | Inventive Example 1 | Inventive Example 2 | Inventive Example 3 |
|---|---|---|---|---|---|
| ORP (mV) | +200 | 0 | −100 | −200 | −400 |
| Iron in precipitate (%) | 35.3 | 45.4 | 52.1 | 55.9 | 56.6 |
| Precipitation of Jarosite | ◯ | Δ | X | X | X |

Table 1 shows iron precipitation behavior depending on the ORP value according to Example 1. Referring to Table 1, in the case of a zinc sulfate solution that was not subjected to a conditioning process (Comparative Example 1), the iron precipitate was precipitated as yellowish jarosite, and the iron content was very low, that is, 35.3%. On the other hand, when the zinc sulfate solution that was subjected to conditioning under the condition that the ORP was 0 mV (vs. Ag/AgCl) or less was used, the iron content was 45.4%, and it was possible to obtain hematite containing a small amount of jarosite. Under the condition that the ORP was −100 mV (vs. Ag/AgCl) or less, it was possible to obtain hematite having iron content of 52% or more.

Example 2

In Example 2, the iron precipitation reaction efficiency depending on the reaction temperature was observed in at a temperature range of 120° C. or higher using a zinc sulfate solution containing 145 g/l of zinc under a pressure of 7 barg. The iron precipitation reaction in Example 2 was carried out without introducing hematite seeds.

The ORP was adjusted to −400 mV (vs. Ag/AgCl) using zinc powder as a reducing agent, a zinc sulfate solution having a zinc concentration of 145 g/l, an iron concentration of 12.4 g/l, and a pH of 4.5 was input into an autoclave, a reaction was performed for 2 hours in the state where the reaction temperature was adjusted to 120° C. to 160° C. at a pressure of 7 barg, and then the temperature was reduced to room temperature. The post-reaction solution containing hematite was subjected to solid-liquid separation using a vacuum filtration apparatus and the iron content in the iron precipitate was quantitatively analyzed using an ICP-AES spectroscopy.

Figure 8:
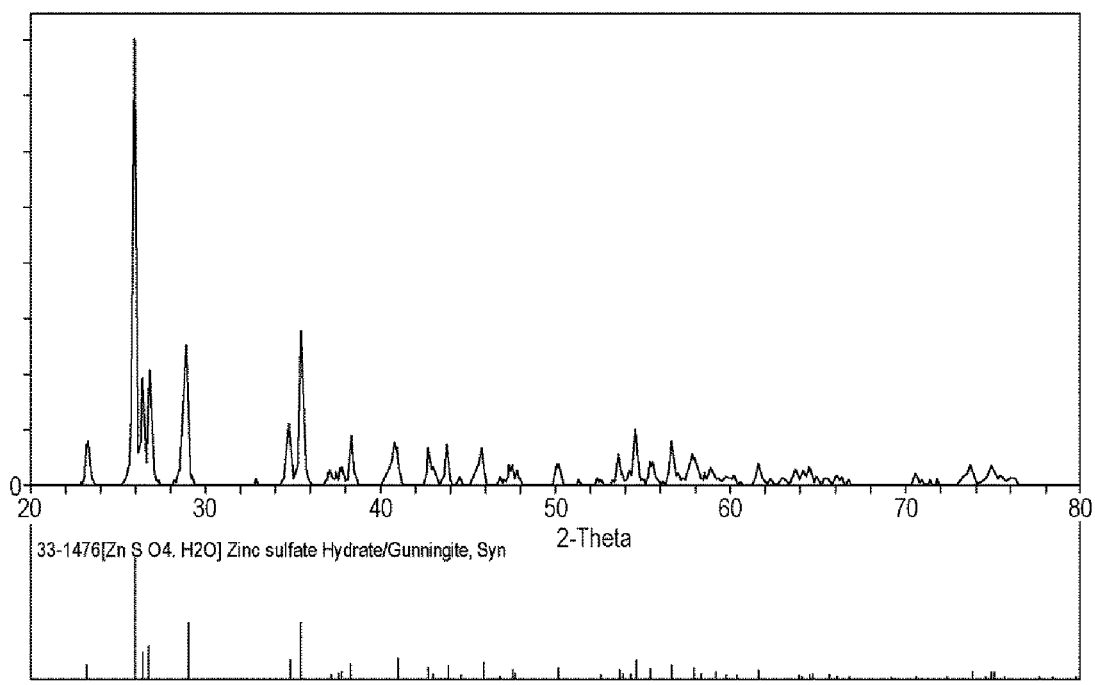
FIG. 8 is a graph representing spectrums according to an X-ray diffraction spectroscopy of a material produced and sticking to a reactor wall.

However, at 160° C., the solubility of zinc sulfate contained in the reaction solution was significantly lowered, and a supersaturated zinc component was precipitated and adhering to the inner wall and the bottom of the autoclave. The crystals of adhering precipitate were observed using an X-ray diffraction analysis method, and as a result, it was observed that the precipitate was Zinc Sulfate Monohydrate (ZSM, ZnSO$_4$H$_2$O) as shown in FIG. 8. The precipitated ZSM may stick to the inside of pipes and apparatuses, which may lower apparatus throughput.

Therefore, when the zinc concentration in the zinc sulfate solution was 145 g/l, it was possible to precipitate and recover the iron in the zinc sulfate solution in the form of hematite when the temperature was 135° C. or higher under a pressure of 7 barg.

Example 3

The ORP was adjusted to −400 mV (vs. Ag/AgCl) using zinc powder as a reducing agent, a zinc sulfate solution having a zinc concentration of 145 g/l, an iron concentration of 12.4 g/l, and pH of 4.5 was input into an autoclave, and the reaction was performed for 2 hours in the state in which the pressure was adjusted to 5 barg to 15 barg by introducing oxygen at a temperature of 145° C., after which the temperature was reduced to room temperature. The iron precipitation reaction in Example 3 was carried out without introducing hematite seeds.

TABLE 2

| | | Comparative Example 3 | Comparative Example 4 | Inventive Example 4 | Inventive Example 5 | Inventive Example 6 | Comparative Example 5 |
|---|---|---|---|---|---|---|---|
| Temperature (° C.) | | 120 | 130 | 135 | 140 | 150 | 160 |
| Post-Reaction Solution | Iron (g/l) | 2.1 | 1.6 | 0.7 | 0.5 | 0.4 | 0.4 |
| | Sulfuric acid (g/l) | 14.3 | 19.2 | 20.9 | 21.2 | 21.5 | 21.5 |
| Iron in precipitate (%) | | 38.7 | 45.3 | 55.7 | 56.6 | 57.7 | 58.4 |
| Iron precipitation rate (%) | | 83.1 | 87.1 | 94.4 | 96.0 | 96.8 | 96.8 |
| Production of Jarosite | | ○ | Δ | X | X | X | X |
| Production of ZSM | | X | X | X | X | X | ○ |

Figure 7:
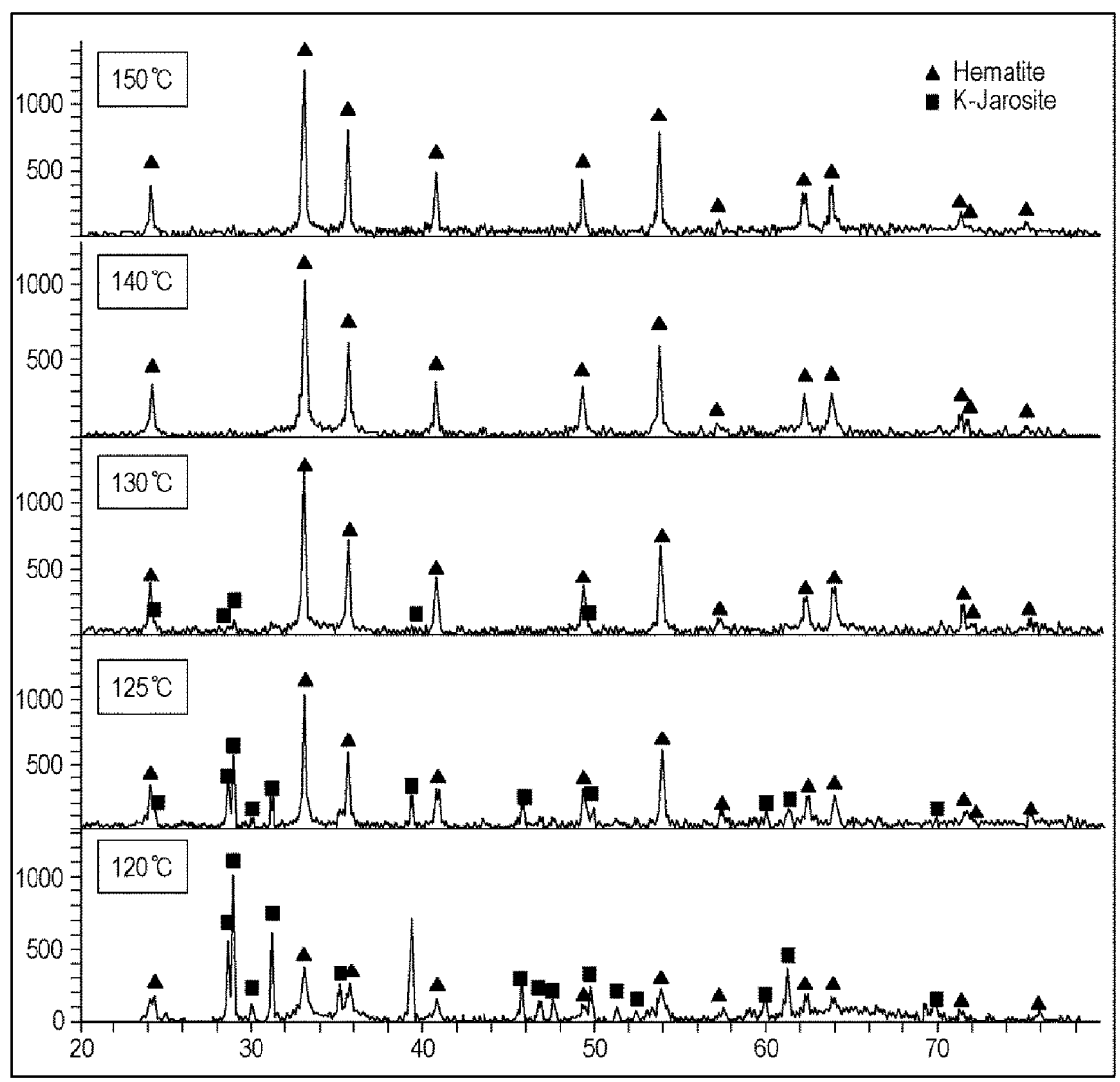
FIG. 7 is a graph representing spectrums according to an X-ray diffraction spectroscopy (XRD) of an iron precipitate according to a reaction temperature.

Table 2 shows iron precipitation behavior depending on the reaction temperature according to Example 2. Referring to Table 2 and FIG. 7, iron was precipitated in the form of yellowish-brown powder at 120° C., and the crystal structure of the obtained precipitate was analyzed using an X-ray diffraction analysis (XRD) method. As a result, it was observed that jarosite was formed. At 130° C., most iron was

TABLE 3

| | | Comparative Example 6 | Inventive Example 7 | Inventive Example 8 | Inventive Example 9 | Inventive Example 10 | Inventive Example 11 |
|---|---|---|---|---|---|---|---|
| Pressure | | 3 barg | 5 barg | 7 barg | 8 barg | 10 barg | 15 barg |
| Post-Reaction Solution | Iron (g/l) | 3.5 | 1.2 | 0.5 | 0.5 | 0.4 | 0.4 |
| | Sulfuric acid (g/l) | 17.1 | 21.2 | 21.2 | 21.5 | 22.1 | 22.3 |
| Iron in precipitate (%) | | 49.2 | 50.1 | 56.6 | 56.9 | 57.2 | 58.2 |
| Iron precipitation rate (%) | | 71.8 | 90.3 | 96.0 | 96.1 | 96.8 | 97.1 |
| Production of Jarosite | | X | X | X | X | X | X |
| Production of ZSM | | X | X | X | X | X | X | precipitated as hematite but in a form in which jarosite is contained together with the hematite. At a higher temperature than 135° C., hematite having iron content of 55% or more was obtained irrespective of the reaction temperature.

Table 3 relates to iron precipitation behavior depending on a pressure according to Example 3. Referring to Table 3, hematite having an iron content of 50% or more in the iron precipitate was obtained at a pressure of 5 barg or more. In the disclosures of Examples 1 to 3, the iron precipitation process was carried out in the state in which no hematite seed was input. It was observed that hematite is formed at a relatively low process temperature (ranging from about 135° C. to 150° C.) and pressure (ranging from about 5 barg to 10 barg) even if no hematite seed was input.

Figure 9:
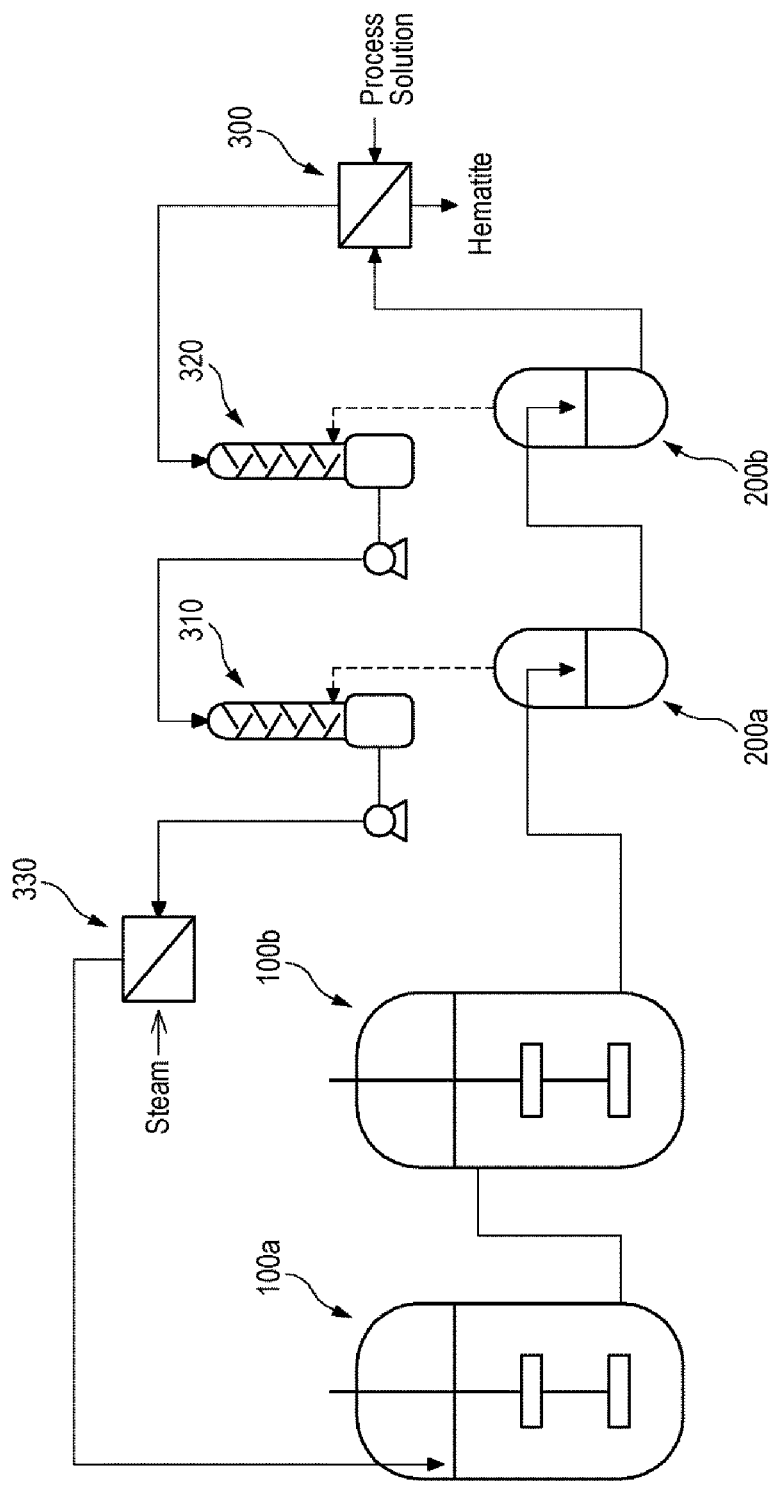
FIG. 9 is an installation diagram of an autoclave apparatus according to an embodiment of the present disclosure.

FIG. 9 is an installation diagram of an autoclave apparatus according to an embodiment of the present disclosure.

Referring to FIG. 9, an autoclave apparatus includes a first and second autoclaves 100a and 100b configured to introduce oxygen thereinto to oxidize Fe (II) contained in a zinc sulfate solution so as to produce hematite, first and second flash vessels 200a and 200b configured to decompress a high-pressure reaction solution discharged from the second autoclave 100b to atmospheric pressure, and a cooler 300 configured to cool the decompressed zinc sulfate solution having a temperature of about 100° C. decompressed in the first and second flash vessels 200a and 200b such that the decompressed zinc sulfate solution can be filtered using a filter press. The structure, in which the first and second autoclaves 100a and 100b and the first and second flash vessels 200a and 200b are connected, may be substantially the same as that described with reference to FIG. 5.

The process solution is primarily heated serving as a heat exchange solution of the cooler 300 and is then heated by first and second heaters 310 and 320 using steam recovered in the first and second heaters 310 and 320. Thereafter, the process solution is heated to a final reaction temperature in a heat exchanger 330 configured to exchange heat using steam, and is then input into the first autoclave 100a.

In the present embodiment, the flash vessel is configured to be divided into the first flash vessel 200a and the second flash vessel 200b in order to improve thermal efficiency to thus improve the steam recovery rate when the process solution is heated by the steam generated in the flash vessel. At this time, it is possible for the generated steam to minimize energy loss by directly heating the process solution using the first heater 310 and the second heater 320, which are respectively connected to the first flash vessel 200a and the second flash vessel 200b. As described above, in the present embodiment, by introducing the process solution into the autoclave via three heating steps, it is possible to recover 90% or more of the energy of the process solution discharged from the autoclave, and thus it is possible to reduce the amount of steam used for maintaining the reaction temperature at a high temperature by 80% or more.

By lining the lower portion and the side portion of the inner wall of the autoclave, which are in contact with the process solution, with the acid-resistant bricks, it is possible to lower the manufacturing cost of the autoclave apparatus and increase the abrasion resistance against the slurry contained in the process solution.

Also, by lining the upper dome portion, which is difficult to line with acid-resistant bricks among the inner wall of the autoclave and in which cracks may be easily generated in the stacked bricks or the acid-resistant bricks may easily fall, with an acid-resistant metal, the manufacturing difficulty of a large-capacity autoclave apparatus can be lowered and the stability of the autoclave apparatus can be enhanced.

Further, in manufacturing a large-capacity vertical autoclave, the height of the autoclave can be reduced, while increasing the diameter of the autoclave. Thus, by preventing the length of the shaft of the agitator from being excessively increased, it is possible to suppress the shaft of the agitator from being bent.

In addition, the process solution input into the autoclave and the process solution discharged from the autoclave are not exposed to the gas-phase portion. Thus, it is possible to suppress salt from being produced in the inlet port, the outlet port, the inlet pipe, and/or the outlet pipe, and to prevent the inlet port, the outlet port, the inlet pipe, and/or the outlet pipe from being clogged by the salt.

In addition, the height of the solution of the autoclave is relatively higher than that of a horizontal autoclave with respect to the solution amount of the same process solution. Therefore, it is possible to ensure a sufficient residence time (or a sufficient reaction time) of oxygen, which is input from the bottom portion of the autoclave, in the process solution, so that the reaction efficiency of oxygen can be improved.

Further, the area of the interface between the solution and the gas-phase portion in the autoclave is relatively small, compared with a horizontal autoclave. Therefore, the amount of salt produced at the interface between the solution and the gas-phase portion can be reduced.

Further, the inner portion of the autoclave has a circular horizontal cross section. Therefore, the autoclave does not have therein angular corners as in the compartments of the horizontal autoclave. Thus, the agitating efficiency can be improved.

Further, the surface level of the solution can be easily adjusted only by a simple operation. Therefore, the produced salt can be easily removed by raising the surface level of the solution to be higher than the produced salt for a predetermined length of time.

While the present disclosure has been described in connection with some embodiments thereof, it shall be understood that various modifications and variations can be made without departing from the spirit and scope of the present disclosure, which may be apparent to a person ordinarily skilled in the art, to which the present disclosure belongs. It shall also be understood that such modifications and variations belong to the scope of the claims appended hereto.

What is claimed is:

1. A vertical autoclave comprising:
an inlet port through which a process solution is introduced;
an outlet port through which the process solution is discharged;
an oxygen inlet port through which oxygen is supplied to the process solution;
an agitator configured to mix the process solution;
an inner wall;
an acid-resistant brick layer lined on a lower portion and a side portion of the inner wall; and
an acid-resistant metal layer lined on an upper portion of the inner wall,
wherein the acid-resistant brick layer does not extend onto the upper portion of the inner wall such that the upper portion of the inner wall is not lined with the acid-resistant brick layer.

2. The vertical autoclave of claim 1, wherein the vertical autoclave has an inner diameter of 5.5 m or more.

3. The vertical autoclave of claim 1, wherein the vertical autoclave has an inner volume of 150 m³ or more.

4. The vertical autoclave of claim 1, wherein a volume of the process solution is 100 m³ or more when the vertical autoclave is operated.

5. The vertical autoclave of claim 1, wherein the inlet port is disposed in the upper portion of the inner wall, and the outlet port is disposed in the side portion of the inner wall.

6. The vertical autoclave of claim 5, wherein the inlet port extends to an inside of the vertical autoclave, and when the vertical autoclave is operated, an end of the inlet port is immersed in the process solution.

7. The vertical autoclave of claim 1, wherein the inlet port and the outlet port are disposed in the side portion of the inner wall, and the inlet port is disposed at a position higher than the outlet port.

8. The vertical autoclave of claim 1, wherein, when the vertical autoclave is operated, a water level of the process solution in the vertical autoclave is adjusted to be lower than an upper portion of the acid-resistant brick layer provided on the side portion of the inner wall.

9. The vertical autoclave of claim 1, wherein the acid-resistant metal layer is lined to extend to an upper end of the side portion of the inner wall.

10. The vertical autoclave of claim 9, wherein, at the upper end of the side portion of the inner wall, the acid-resistant metal layer extends between the inner wall and the acid-resistant brick layer.

11. A vertical autoclave, comprising:
an inlet port through which a process solution is introduced;
an outlet port through which the process solution is discharged;
an oxygen inlet port through which oxygen is supplied to the process solution;
an agitator configured to mix the process solution;
an inner wall;
an acid-resistant brick layer lined on a lower portion and a side portion of the inner wall;
an acid-resistant metal layer lined on an upper portion of the inner wall; and
a cap ring which covers an upper portion of the acid-resistant brick layer on the side portion of the inner wall.

12. The vertical autoclave of claim 11, further comprising a membrane layer provided between the inner wall and the acid-resistant brick layer,
wherein the membrane layer is provided to extend between the upper portion of the acid-resistant brick layer and the cap ring.

13. The vertical autoclave of claim 11, further comprising a plurality of ribs which connect the cap ring and the acid-resistant metal layer.

14. The vertical autoclave of claim 13, wherein the cap ring and the plurality of ribs are formed of a same material as the acid-resistant metal layer.

15. The vertical autoclave of claim 13, wherein voids are formed among the plurality of ribs, the cap ring, and the acid-resistant metal layer.

16. A vertical autoclave, comprising:
an inlet port through which a process solution is introduced;
an outlet port through which the process solution is discharged;
an oxygen inlet port through which oxygen is supplied to the process solution;
an agitator configured to mix the process solution;
an inner wall;
an acid-resistant brick layer lined on a lower portion and a side portion of the inner wall;
an acid-resistant metal layer lined on an upper portion of the inner wall,
wherein the oxygen inlet port is disposed in the lower portion of the inner wall,
an oxygen inlet line connected to the oxygen inlet port; and
a cooling water passage disposed to surround the oxygen inlet port.

17. The vertical autoclave of claim 16, further comprising a high-pressure steam line communicating with the oxygen inlet line, wherein steam is supplied through the high-pressure steam line to the oxygen inlet port.

18. An autoclave apparatus comprising:
a first autoclave; and
a second autoclave,
wherein the first autoclave and the second autoclave are connected in series, and
wherein each of the first autoclave and the second autoclave is a vertical autoclave comprising:
an inlet port through which a process solution is introduced,
an outlet port through which the process solution is discharged,
an oxygen inlet port through which oxygen is supplied to the process solution,
an agitator configured to mix the process solution,
an inner wall,
an acid-resistant brick layer lined on a lower portion and a side portion of the inner wall, and
an acid-resistant metal layer lined on an upper portion of the inner wall,
wherein the acid-resistant brick layer does not extend onto the upper portion of the inner wall such that the upper portion of the inner wall is not lined with the acid-resistant brick layer.

19. The autoclave apparatus of claim 18, further comprising a connection pipe which connects the first autoclave and the second autoclave to each other,
wherein an upper stream side of the connection pipe corresponds to the outlet port of the first autoclave, and a lower stream side of the connection pipe corresponds to the inlet port of the second autoclave.

20. The autoclave apparatus of claim 19, wherein, when the first autoclave and the second autoclave are operated, the outlet port of the first autoclave is immersed in a solution in the first autoclave, and the inlet port of the second autoclave is immersed in a solution in the second autoclave.

21. The autoclave apparatus of claim 18, wherein the first autoclave is installed at a position higher than the second autoclave.

22. The autoclave apparatus of claim 18, further comprising at least one flash vessel connected to the outlet port of the second autoclave.

23. A method of removing salt from an autoclave, the method comprising:
raising a surface level of a solution in the autoclave from a first level to a second level such that salt in the autoclave is immersed in the solution; and
maintaining the surface level of the solution at the second level,
wherein the salt is dissolved in the solution while the surface level of the solution is maintained at the second level.

24. The method of claim 23, wherein the salt is water-soluble.

25. The method of claim 23, wherein the process of maintaining the surface level of the solution at the second level is performed for one hour to six hours.

26. The method of claim 23, further comprising lowering the surface level of the solution from the second level to the first level.

27. The method of claim 23, wherein the autoclave is a vertical autoclave comprising an inlet port through which a process solution is introduced, an outlet port through which the process solution is discharged, an oxygen inlet port through which oxygen is supplied to the process solution, an agitator configured to mix the process solution, an inner wall, an acid-resistant brick layer lined on a lower portion and a side portion of the inner wall, and an acid-resistant metal layer lined on an upper portion of the inner wall.

28. The method of claim 27, wherein the second level is lower than an uppermost surface level of the acid-resistant brick layer.

29. The method of claim 27, wherein the autoclave further comprises a cap ring which covers an upper portion of the acid-resistant brick layer on the side portion of the inner wall.

30. The method of claim 29, wherein the second level is lower than a lowermost surface level of the cap ring.

* * * * *